(12) United States Patent
Sengoku

(10) Patent No.: US 9,928,208 B2
(45) Date of Patent: Mar. 27, 2018

(54) METHODS TO SEND EXTRA INFORMATION IN-BAND ON INTER-INTEGRATED CIRCUIT (I2C) BUS

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 386 days.

(21) Appl. No.: 14/700,860

(22) Filed: Apr. 30, 2015

(65) Prior Publication Data
US 2015/0286608 A1    Oct. 8, 2015

Related U.S. Application Data

(63) Continuation of application No. 14/243,459, filed on Apr. 2, 2014, now Pat. No. 9,710,423.

(51) Int. Cl.
G06F 13/42         (2006.01)
G06F 13/364        (2006.01)
H04L 12/64         (2006.01)

(52) U.S. Cl.
CPC ........ *G06F 13/4291* (2013.01); *G06F 13/364* (2013.01); *G06F 13/42* (2013.01); *H04L 12/6418* (2013.01); *G06F 13/4282* (2013.01)

(58) Field of Classification Search
CPC . G06F 13/364; G06F 13/4282; G06F 13/4291
See application file for complete search history.

(56) References Cited

U.S. PATENT DOCUMENTS 6,078,192 A     6/2000   Mitten et al.
6,463,496 B1   10/2002   Klein et al.
(Continued)

FOREIGN PATENT DOCUMENTS

DE    102012110732 B3    6/2013
WO    WO-2012038472 A1   3/2012

OTHER PUBLICATIONS

Wikipedia: "Differential Signaling", accessed on Jun. 8, 2016, pp. 5, URL: https://en.wikipedia.org/wiki/Differential_signaling.
(Continued)

*Primary Examiner* — Brian T Misiura
(74) *Attorney, Agent, or Firm* — Loza & Loza LLP

(57) ABSTRACT

System, methods and apparatus are described that offer improved performance of an Inter-Integrated Circuit (I2C) bus. Primary data may be encoded in first signaling in accordance with I2C bus protocols, and the first signaling may be combined with second signaling to obtain combined signaling for transmission on an I2C bus. Secondary data may be encoded in the second signaling with the combined signaling remaining compatible with the I2C bus protocols. The second signaling may modulate a voltage level of at least one signal in the first signaling. The second signaling may pulse-width modulate a clock signal transmitted on the I2C bus. The second signaling may modify a start condition between bytes transmitted on the I2C bus. The second signaling may add a plurality of short pulses to a clock signal transmitted in the first signaling.

24 Claims, 15 Drawing Sheets

(56) References Cited

U.S. PATENT DOCUMENTS

| | | | |
|---|---|---|---|
| 7,088,137 B2 | 8/2006 | Behrendt et al. | |
| 7,514,962 B2* | 4/2009 | Kumar | G06F 13/4282 326/82 |
| 7,692,450 B2 | 4/2010 | Aranovsky | |
| 7,882,282 B2* | 2/2011 | Haban | G06F 13/4282 348/725 |
| 7,944,245 B2* | 5/2011 | Saxena | H03K 5/1252 327/34 |
| 7,999,596 B2* | 8/2011 | Horton | H03K 5/1252 327/261 |
| 8,112,569 B2* | 2/2012 | Vitanescu | G06F 13/4291 710/305 |
| 8,558,577 B1 | 10/2013 | Soriano et al. | |
| 8,948,209 B2* | 2/2015 | Tailliet | G06F 13/4291 370/352 |
| 9,509,372 B2* | 11/2016 | Seifried | H04L 12/10 |
| 9,684,624 B2* | 6/2017 | Sengoku | G06F 13/4234 |
| 2008/0117994 A1 | 5/2008 | Shetty | |
| 2010/0255560 A1 | 10/2010 | Call et al. | |
| 2011/0194595 A1 | 8/2011 | Shetty | |
| 2011/0255560 A1 | 10/2011 | Tailliet | |
| 2013/0304999 A1 | 11/2013 | Imai | |
| 2013/0346763 A1 | 12/2013 | Decesaris et al. | |
| 2014/0181336 A1 | 6/2014 | Toba et al. | |
| 2015/0234774 A1* | 8/2015 | Sengoku | G06F 13/4295 710/106 |
| 2015/0286606 A1 | 10/2015 | Sengoku | |
| 2016/0364305 A1* | 12/2016 | Pitigoi-Aron | G06F 11/221 |
| 2017/0104607 A1* | 4/2017 | Sengoku | H04L 12/40019 |

OTHER PUBLICATIONS

Microchip, "I2C™ Master Mode," Version 0.40, Getting Startred: I2C Master Mode, 2001, Available at: http://ww1.microchip.com/downloads/en/DeviceDoc/i2c.pdf, 88 pages.

Philips Semiconductors: "The I2C-Bus Specification", Version 2.1, Jan. 2000, Available at: http://151.100.120.244/personale/balsi/didattica/testi/testiSE-9.pdf, pp. 8-14.

International Search Report and Written Opinion—PCT/US2015/023898—ISA/EPO—dated Jul. 7, 2015.

* cited by examiner

METHODS TO SEND EXTRA INFORMATION IN-BAND ON INTER-INTEGRATED CIRCUIT (I2C) BUS

CROSS-REFERENCE TO RELATED APPLICATIONS

This application is a continuation of, and claims priority from, patent application Ser. No. 14/243,459 filed in the U.S. Patent Office on Apr. 2, 2014, the entire content of which is incorporated herein by reference.

BACKGROUND

Field

The present disclosure relates generally to an interface between processors and a peripheral devices and, more particularly, to improving data communications capabilities of a serial bus.

Background

The Inter-Integrated Circuit serial bus, which may also be referred to as the I2C bus or the I²C bus, is a serial single-ended computer bus that was intended for use in connecting low-speed peripherals to a processor. The I2C bus is a multi-master bus in which each device can serve as a master and a slave for different messages transmitted on the I2C bus. The I2C bus can transmit data using only two bidirectional open-drain connectors, including a Serial Data Line (SDA) and a Serial Clock Line (SCL). The connectors typically include signal wires that are terminated by pull-up resistors. Original implementations of I2C supported data signaling rates of up to 100 kilobits per second (100 kbps) in standard-mode operation, with more recent standards supporting speeds of 400 kbps in fast-mode operation, and 1 megabit per second (Mbps) in fast-mode plus operation.

In some systems and apparatus, however, higher bandwidths are required to support communications between certain types of devices. For example, mobile communications devices, such as cellular phones, may employ multiple devices, such as cameras, displays and various communications interfaces that consume significant bandwidth. Higher bandwidths may be difficult to obtain when conventional I2C protocols are used to maintain compatibility with legacy devices. Accordingly, there exists an ongoing need for providing optimized communications on serial interfaces configured as a bus connecting master and slave components within a mobile device.

SUMMARY

Embodiments disclosed herein provide systems, methods and apparatus that provide improved performance of an I2C bus. Primary data may be encoded in first signaling in accordance with I2C bus protocols, and the first signaling may be combined with second signaling to obtain combined signaling for transmission on an I2C bus in accordance with the I2C protocols, specifications and/or de-facto standards.

In an aspect of the disclosure, a method of data communications includes encoding primary data in an I2C signal in accordance with I2C bus protocols, encoding secondary data in the I2C signal to obtain a multi-channel signal, and transmitting the multi-channel signal on an I2C bus. The multi-channel signal may be compatible with the I2C bus protocols.

In another aspect, encoding the secondary data in the I2C signal includes encoding the secondary data in a differential signal, the differential signal including a pair of complementary signals, and transmitting the differential signal on the I2C bus by transmitting one of the pair of complementary signals on the SDA of the I2C bus and a different one of the pair of complementary signals on the SCL of the I2C bus.

The differential signal may be transmitted on the I2C bus when both the SDA and the SCL are at the high logic level. The SDA and the SCL may have voltage levels that are greater than a minimum voltage specified by the I2C bus protocols for a high logic level and less than a maximum voltage specified by the I2C bus protocols for the high logic level while the differential signal is transmitted over the SDA and the SCL. The differential signal may be transmitted during a period of time when the I2C bus is idle.

In another aspect, encoding the secondary data in the I2C signal includes encoding the secondary data in an FM signal, and transmitting the FM signal over one or more of the SDA of the I2C bus and the SCL of the I2C bus. The FM signal may have an amplitude that is less than a minimum hysteresis voltage level for Schmitt trigger inputs used by a receiver of an I2C compatible device. The minimum hysteresis voltage level may be defined in the I2C bus protocols.

In another aspect, encoding the secondary data in the I2C signal includes inserting or refraining from inserting a short pulse into a signal transmitted on the SDA of the I2C bus or on the SCL of the I2C bus. For example, a short pulse may be inserted when a value of a bit of the secondary data to be transmitted has a first value and the short pulse may be omitted when the bit of the secondary data to be transmitted has a second value. In one example, the secondary data may be encoded in the I2C signal by inserting or refraining from inserting short pulses into a plurality of half cycles of a clock signal transmitted on the SCL. The short pulse may have a duration that is less than a minimum duration specified by the I2C bus protocols for a pulse of the clock signal. The short pulse may have a duration that is less than a maximum duration specified by the I2C bus protocols for a spike that is to be ignored by an I2C receiver.

In another aspect, encoding the secondary data in the I2C signal includes pulse-width modulating a clock signal transmitted on the SCL of the I2C bus. Each high period of the resultant pulse-width modulated clock signal has a duration that exceeds a minimum high period for an SCL clock specified by the I2C bus protocols and each low period of the pulse-width modulated clock signal has a duration that exceeds a minimum low period for an SCL clock specified by the I2C bus protocols.

In another aspect, the primary data may be encoded in frames to be transmitted on the I2C bus. Encoding the secondary data in the I2C signal may include transmitting a stop condition followed by a start condition between frames of primary data when a bit of the secondary data to be transmitted has a first value, and transmitting a repeated start condition when the bit of the secondary data to be transmitted has a second value.

In another aspect, the primary data is encoded in frames to be transmitted on the I2C bus. Encoding the secondary data in the I2C signal may include transmitting a repeated start condition between frames of primary data, where the repeated start condition has a first of two predefined durations when a bit of the secondary data to be transmitted has a first value, and transmitting a repeated start condition that has a second of two predefined durations when the bit of the secondary data to be transmitted has a second value.

In an aspect of the disclosure, an apparatus configured to transmit data on an I2C bus includes an encoder having a processing circuit. The processing circuit may be configured to encode primary data in an I2C signal in accordance with I2C bus protocols, encode secondary data in the I2C signal to provide a multi-channel signal, and a transmitter configured to transmit the multi-channel signal on an I2C bus in accordance with the I2C bus protocols.

In another aspect, the processing circuit of the encoder is configured to encode the secondary data by encoding the secondary data in a differential signal or an FM signal that is superimposed on the I2C signal.

In another aspect, the processing circuit of the encoder may be configured to encode the secondary data by pulse-width modulating a clock signal transmitted on the SCL of the I2C bus, or by selectively adding short pulses to the SDA of the I2C bus or the SCL. The short pulses may have a duration that is less than a maximum duration specified by the I2C bus protocols for a spike that is to be ignored by an I2C receiver.

In another aspect, the processing circuit of the encoder may be configured to encode the secondary data by using bits of the secondary data to select type of start condition transmitted between frames of primary data transmitted on the I2C bus. The processing circuit of the encoder may be configured to encode the secondary data by using the bits of the secondary data to select duration of repeated start conditions transmitted between the frames of primary data.

In an aspect of the disclosure, a method of data communications includes decoding primary data received from an I2C signal in accordance with I2C bus protocols, and decoding secondary data from the I2C signal. The secondary data is decoded using a protocol other than the I2C bus protocol. The I2C signal complies with the I2C bus protocols.

In another aspect, decoding secondary data includes receiving a differential pair of signals from the SDA and the SCL of the I2C bus, where the SDA and the SCL carry different ones of the differential pair of signals, and decoding the secondary data from the differential pair of signals. The differential pair of signals may be received from the I2C bus when both the SDA and the SCL are at a high logic level. The SDA and the SCL may have voltage levels that are greater than a minimum voltage specified by the I2C bus protocols for the high logic level and less than a maximum voltage specified by the I2C bus protocols for the high logic level while the differential pair of signals is received from the I2C bus. The differential pair of signals is received during a period of time when the I2C bus is idle.

In another aspect, decoding the secondary data may include receiving an FM signal from at least one of the SDA or the SCL of the I2C bus, and decoding the secondary data from the FM signal. The FM signal may have an amplitude that is less than a minimum hysteresis voltage level for Schmitt trigger inputs in a receiver of an I2C compatible device as defined in the I2C bus protocols. The voltages of the SDA and the SCL may be greater than a minimum voltage specified by the I2C bus protocols for a high logic level and less than a maximum voltage specified by the I2C bus protocols for the high logic level while the FM signal is being received.

In another aspect, decoding secondary data includes determining presence or absence of short pulses in a signal received from the SDA of the I2C bus or the SCL of the I2C bus, and decoding the secondary data based on the presence or absence of the short pulses. Each of the short pulses may have a duration that is less than a maximum duration specified by the I2C bus protocols for a spike that is to be ignored.

In another aspect, decoding secondary data includes determining presence or absence of short pulses in a plurality of half cycles of a clock signal received from the SCL of the I2C bus, and decoding the secondary data based on the presence or absence of the short pulses. Each of the short pulses may have a duration that is less than a maximum duration specified by the I2C bus protocols for a spike that is to be ignored.

In another aspect, decoding secondary data includes decoding secondary data in a pulse-width modulated clock signal received from the SCL of the I2C bus. Each high period of the pulse-width modulated clock signal has a duration that exceeds a minimum high period for an SCL clock specified by the I2C bus protocols and each low period of the pulse-width modulated clock signal has a duration that exceeds a minimum low period for an SCL clock specified by the I2C bus protocols.

In another aspect, decoding secondary data includes determining a first value for a bit of secondary data when a stop condition and a start condition is received between consecutive frames carrying the primary data on the SDA of the I2C bus, and determining a second value for the bit of secondary data when a repeated start condition is received between the consecutive frames.

In another aspect, decoding secondary data includes determining a first value for a bit of secondary data when a repeated start condition received between consecutive frames carrying the primary data on the SDA of the I2C bus has a first duration, and determining a second value for the bit of secondary data when the repeated start condition has a second duration.

In an aspect of the disclosure, an apparatus is configured to receive data from an I2C bus. The apparatus may include means for decoding primary data received from an I2C signal in accordance with I2C bus protocols, and means for decoding secondary data from the I2C signal. The secondary data is decoded using a protocol other than the I2C bus protocol. The I2C signal may comply with the I2C bus protocols.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
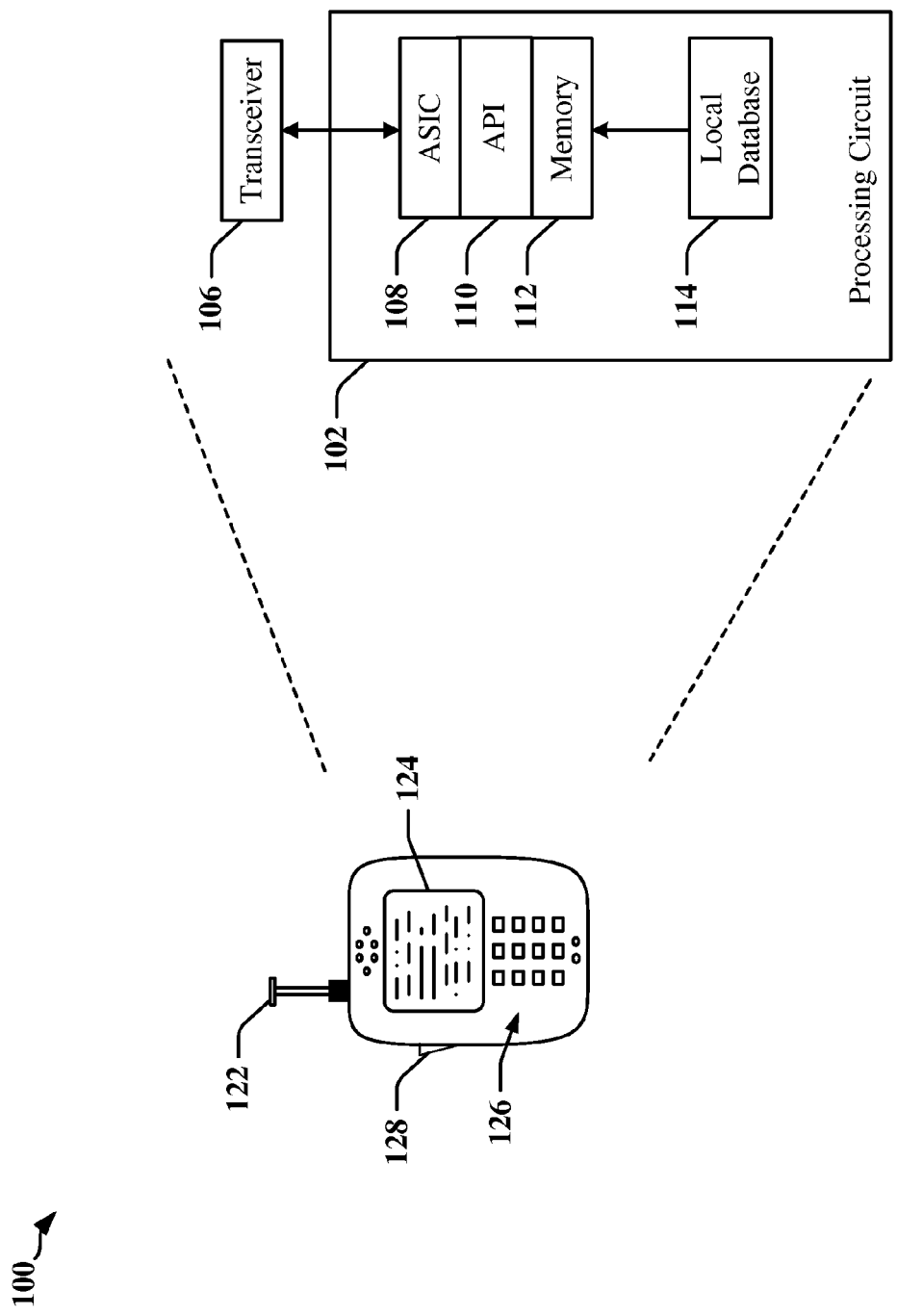
FIG. 1 depicts an apparatus employing a data link between IC devices that selectively operates according to one of plurality of available standards.

Certain aspects of the invention may be applicable to communications links deployed between electronic devices that are subcomponents of a mobile apparatus such as a telephone, a mobile computing device, an appliance, automobile electronics, avionics systems, etc. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similar functioning device. FIG. 1 depicts an example of an apparatus 100 that may employ a communication link between IC devices. The apparatus 100 may include a wireless communication device that communicates through an RF transceiver with a radio access network (RAN), a core access network, the Internet and/or another network. The apparatus 100 may include a communications transceiver 106 operably coupled to a processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as a memory 112 that may maintain instructions and data that may be executed by processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate apparatus 100. The local database 114 may be implemented using one or more of a database module, flash memory, magnetic media, EEPROM, optical media, tape, soft or hard disk, or the like. The processing circuit may also be operably coupled to external devices such as an antenna 122, a display 124, operator controls, such as a button 128 and a keypad 126, among other components.

Figure 2:
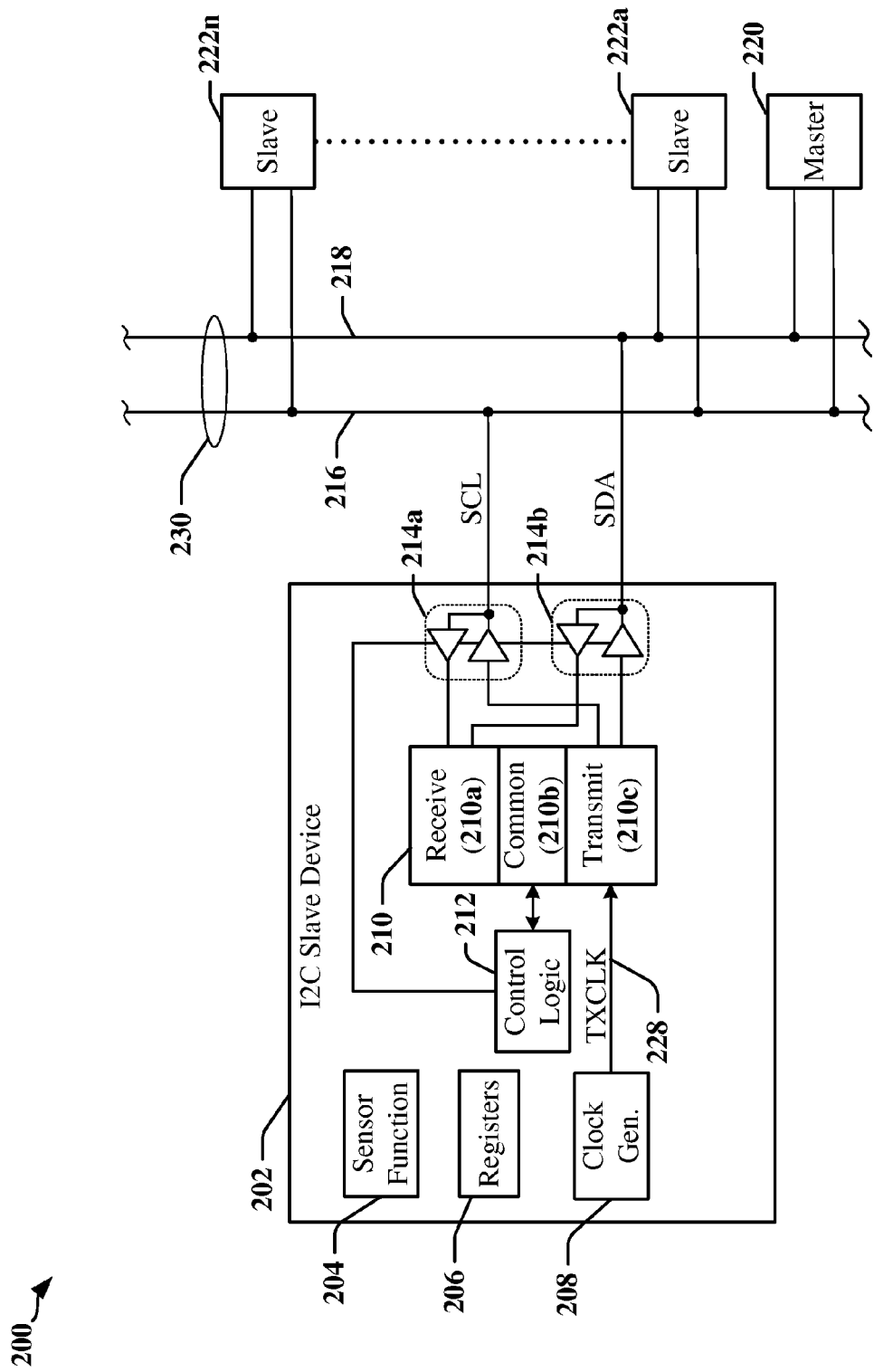
FIG. 2 is a block schematic drawing illustrating certain aspects of an apparatus connected to an I2C communications bus.

FIG. 2 is a block schematic drawing illustrating certain aspects of an apparatus 200 that includes multiple devices 202, 220 and 222a-222n connected to a communications bus 230. The apparatus 200 may be embodied in a mobile apparatus. In one example, the apparatus 200 includes multiple devices 202, 220 and 222a-222n that communicate using an I2C bus 230 and at least one imaging device 202 may be configured to operate as a slave device on the I2C bus 230. The imaging device 202 may be adapted to provide a sensor control function 204 that manages an image sensor, for example. In addition, the imaging device 202 may include configuration registers or other storage 206, control logic 212, a transceiver 210 and line drivers/receivers 214a and 214b. The control logic 212 may include a processing circuit such as a state machine, sequencer, signal processor or general-purpose processor. The transceiver 210 may include a receiver 210a, a transmitter 210c and common circuits 210b, including timing, logic and storage circuits and/or devices. In one example, the transmitter 210c encodes and transmits data based on timing provided by a clock generation circuit 208.

Two or more of the I2C devices 202, 220 and/or 222a-222n may be adapted according to certain aspects and features disclosed herein to extend the bandwidth and other capabilities provided by a conventional I2C bus. For example, the I2C devices 202, 220 and/or 222a-222n may be adapted to support a higher bit rate than can ordinarily be achieved when conventional I2C protocols are used to manage communications on the I2C bus 230. The I2C protocols may conform to de facto I2C standards and may include specifications defining electrical and timing aspects of I2C signals, in addition to data formats and I2C bus control and timing.

Figure 3:
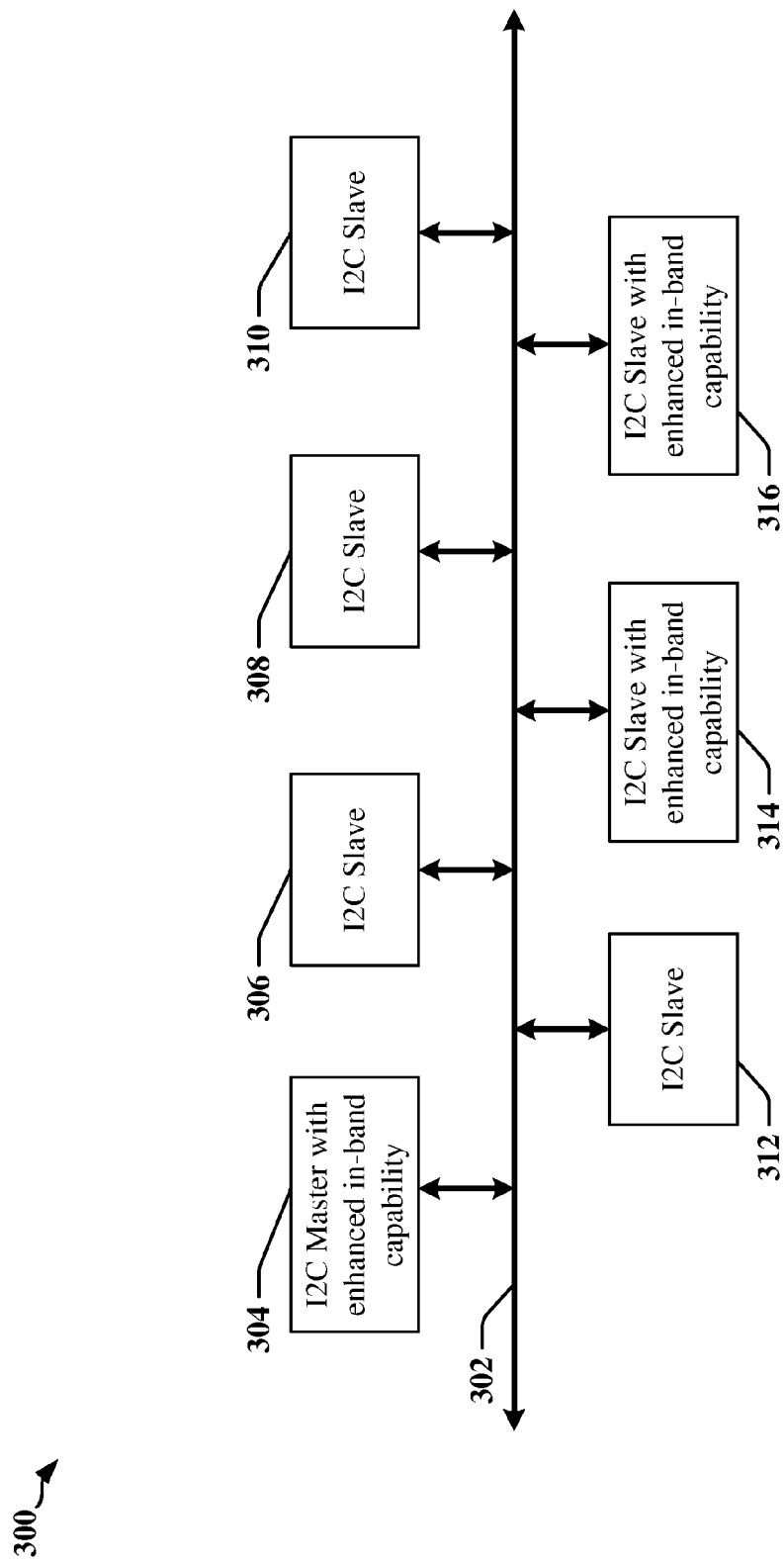
FIG. 3 illustrates a configuration of I2C connected to a common I2C bus.

FIG. 3 illustrates a configuration of I2C devices 304, 306, 308, 310, 312, 314 and 316 connected to an I2C bus 302, whereby three devices 304, 314 and 316 are adapted or configured to obtain higher data transfer rates over the I2C bus 302. The adapted devices 304, 314 and 316 may coexist with conventionally configured I2C devices 306, 308, 310 and 312, and the adapted devices 304, 314 and 316 may communicate using conventional I2C protocols, as desired or needed. For the purposes of this description, communications using conventional I2C protocols may be considered to be a primary communication channel on the I2C bus 302, while the enhanced communications capabilities disclosed herein may be provided as one or more secondary or virtual communication channels that coexist on the I2C bus with the primary communication channel.

A secondary communication channel may be available when an enhanced I2C device 304 controls the I2C bus 302 as a bus master. In the depicted example, one I2C device 304 is currently serving as a bus master 304, and the bus master 304 may provide one or more secondary communication channels that can be monitored by slave I2C devices 314 and 316 that have been adapted according to certain aspects disclosed herein. Additional data (secondary data) can be transferred over the I2C bus 302 in a secondary channel without using an external bridge device and without compromising the functionality of legacy I2C devices 306, 308, 310 and 312 on the I2C bus 302.

Figure 4:
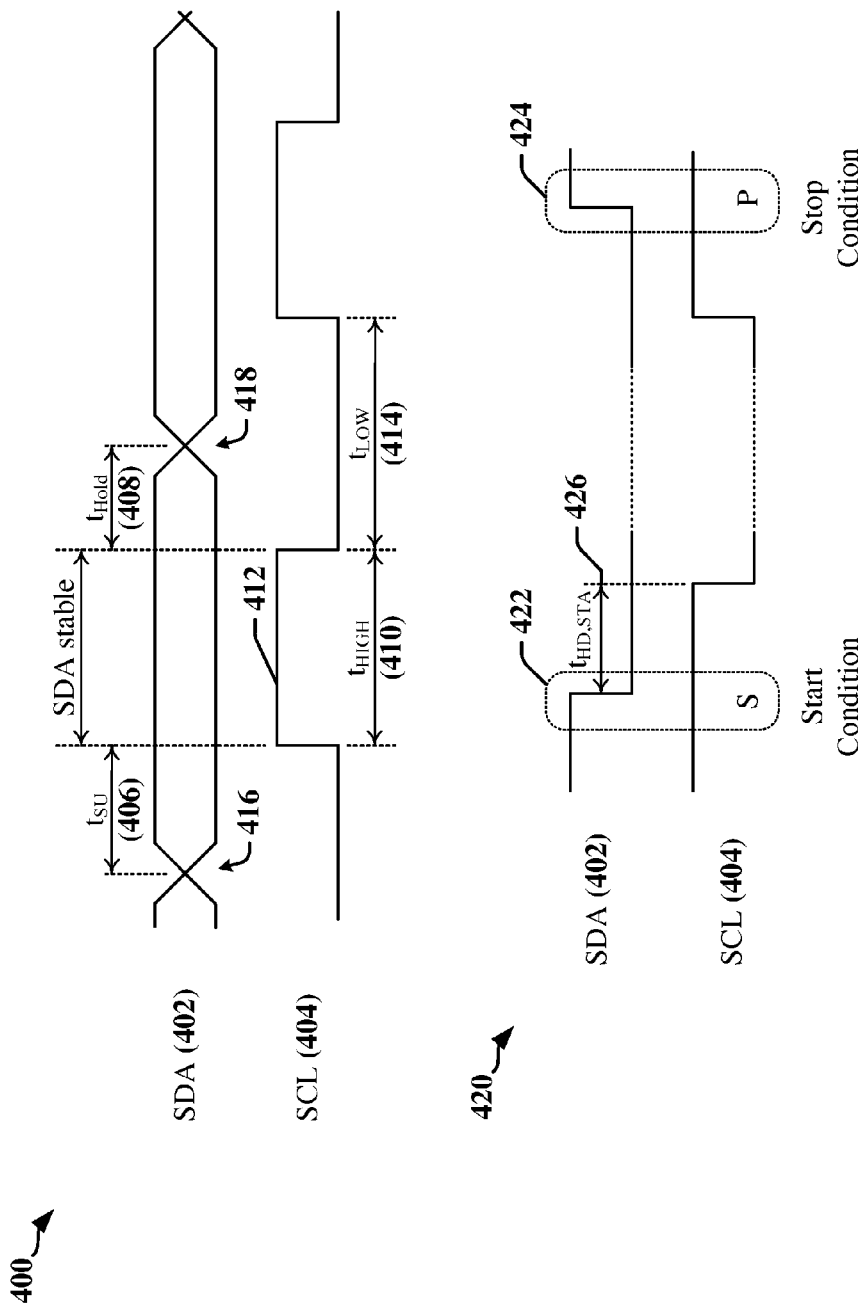
FIG. 4 is a timing diagram that illustrates the relationship between SDA and SCL signal wires on a conventional I2C bus.

FIG. 4 includes timing diagrams 400 and 420 that illustrate the relationship between SDA and SCL signal wires 402, 404 on a conventional I2C bus. The first timing diagram 400 illustrates the timing relationship between the SDA signal wire 402 and the SCL signal wire 404 while data is being transferred on the conventionally configured I2C bus. The SCL signal wire 404 provides a series of clocking pulses 412 that can be used to sample data in the SDA signal wire 402. When the SCL signal wire 404 is in a logic high state during data transmission, data on the SDA signal wire 402 is required to be stable and valid, such that the state of the SDA signal wire 402 is not permitted to change when the SCL signal wire 404 is in a high state.

Specifications for conventional I2C protocol implementations (herein referred to as "I2C Specifications") define a minimum duration for the high period ($t_{HIGH}$) 410 of each pulse 412 on the SCL signal wire 404, where the pulse 412 corresponds to the time in which the SCL signal wire 404 is in a High logic state. The I2C Specifications also define minimum durations for a setup time ($t_{SU}$) 406 and a hold time ($t_{Hold}$) 408, during which the signaling state of the SDA signal wire 402 must be stable before and after the pulse 412 during which the SDA signal wire 402 is in the high logic state. The setup time 406 defines a maximum time period after a transition 416 between signaling states on the SDA signal wire 404 until the arrival of the rising edge of a pulse 412 on the SCL signal wire 404. The hold time 408 defines a minimum time period after the falling edge of the pulse 412 on the SCL signal wire 404 until a next transition 418 between signaling states on the SDA signal wire 404. The I2C Specifications also define a minimum duration for a low period ($t_{LOW}$) 414 for the SCL signal wire 404. The data on the SDA signal wire 402 is typically captured for the period of time ($t_{HIGH}$) 410 when the SCL signal wire 404 is in the High logic state after the leading edge of the pulse 412.

The second timing diagram 420 of FIG. 4 illustrates signaling states on the SDA signal wire 402 and the SCL signal wire 404 between data transmissions on a conventional I2C bus. The I2C protocol provides for transmission of 8-bit data (bytes) and 7-bit addresses. Data transmissions are acknowledged by the receiver that drives the SDA signal wire 402 for one clock period, such that a low signaling state represents an acknowledgement (ACK) indicating successful reception and a high signaling state represents a negative acknowledgement (NACK) indicating a failure to receive or an error in reception.

A start condition 422 is defined to permit the current bus master to signal that data is to be transmitted. The start condition 422 occurs when the SDA signal wire 402 transitions from high to low while the SCL signal wire 404 is high. The I2C bus master initially transmits the start condition 422, which may be also be referred to as a start bit, followed by a 7-bit address of an I2C slave device with which it wishes to exchange data. The address is followed by a single bit that indicates whether a read or write operation is to occur. The addressed I2C slave device, if available, responds with an ACK bit. The master and slave I2C devices then exchange bytes of information in frames, in which the bytes are serialized such that the most significant bit (MSB) is transmitted first. The transmission of the byte is completed when a stop condition 424 is transmitted by the I2C master device. The stop condition 424 occurs when the SDA signal wire 402 transitions from low to high while the SCL signal wire 404 is high. The I2C Specifications require that all transitions of the SDA signal wire 402 occur when the SCL signal wire 404 is low, and exceptions may be treated as a start condition 422 or a stop condition 424.

Figure 5:
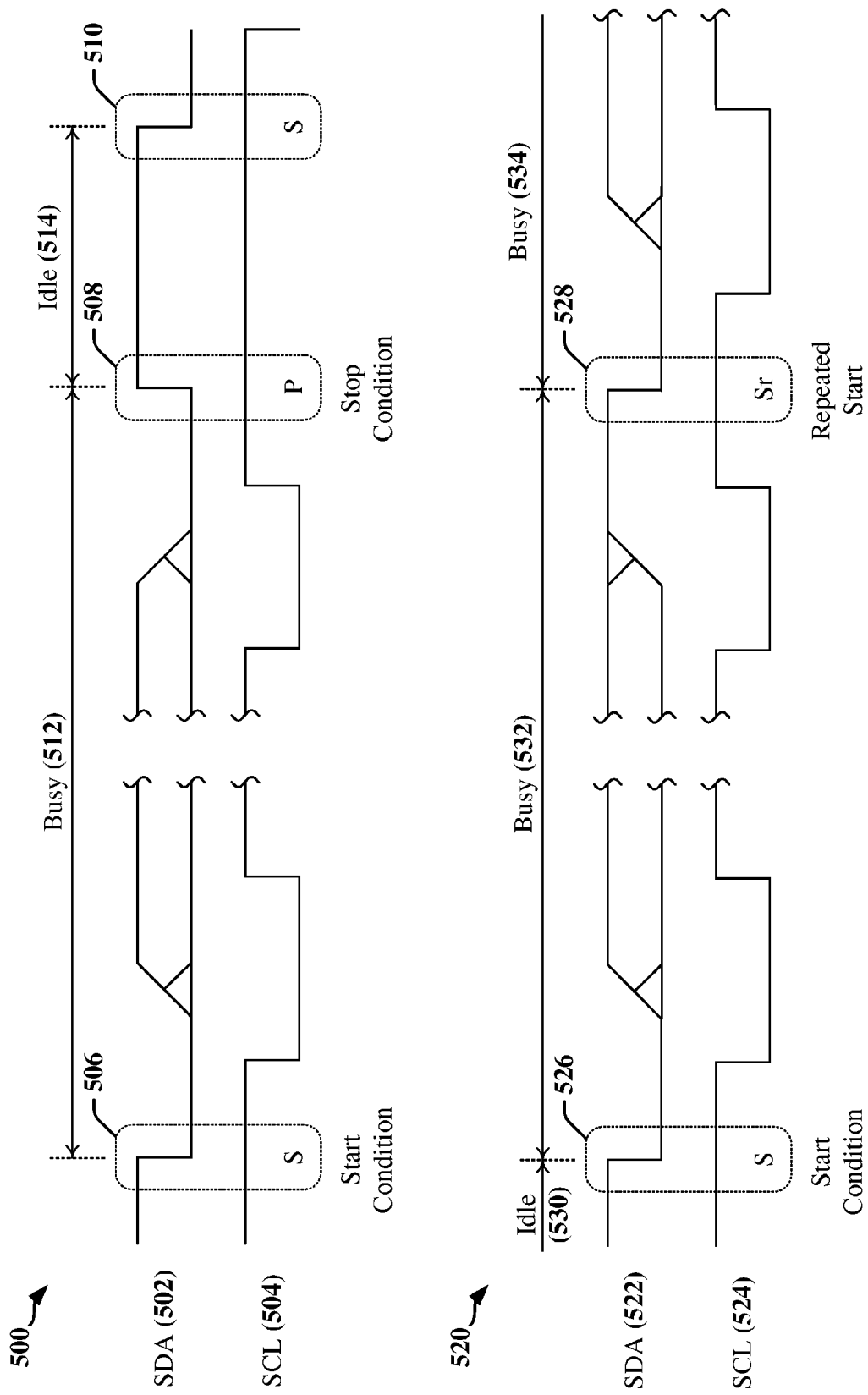
FIG. 5 is a timing diagram that illustrates timing associated with multiple frames transmitted on an I2C bus.

FIG. 5 includes timing diagrams 500 and 520 that illustrate timing associated with multiple data transmissions on an I2C bus. In a first basic example, the period of time 514 that elapses between a stop condition 508 and a consecutive start condition 510 may be prolonged, causing the conventional I2C bus to be idle during this period of time 514. In operation, a busy period 512 commences when the I2C bus master transmits a first start condition 506, followed by data. The busy period 512 ends when the I2C bus master transmits a stop condition 508 and an idle period 514 ensues. The idle period 514 ends with transmission of a second start condition 510.

With reference also to the timing diagram 520, in some instances, the idle periods 514 between successive data transmissions on the I2C bus may be reduced in number or eliminated by transmitting a repeated start condition (Sr) 528 rather than a stop condition. The repeated start condition 528 terminates the preceding data transmission and simultaneously indicates the commencement of a next data transmission. The state transition on the SDA signal wire 522 is identical for a start condition 526 occurring after an idle period 530 and the repeated start condition 528. Specifically, the SDA signal wire 522 transitions from high to low while the SCL signal wire 524 is high. When a repeated start condition 528 is used between data transmissions, a first busy period 532 is immediately followed by a second busy period 534.

FIGS. 6-10 provide examples in accordance with certain aspects disclosed herein showing the exploitation of specifications governing the operation of an I2C bus and protocols to enable additional in-band data to be transmitted in-band on the I2C bus.

Figure 6:
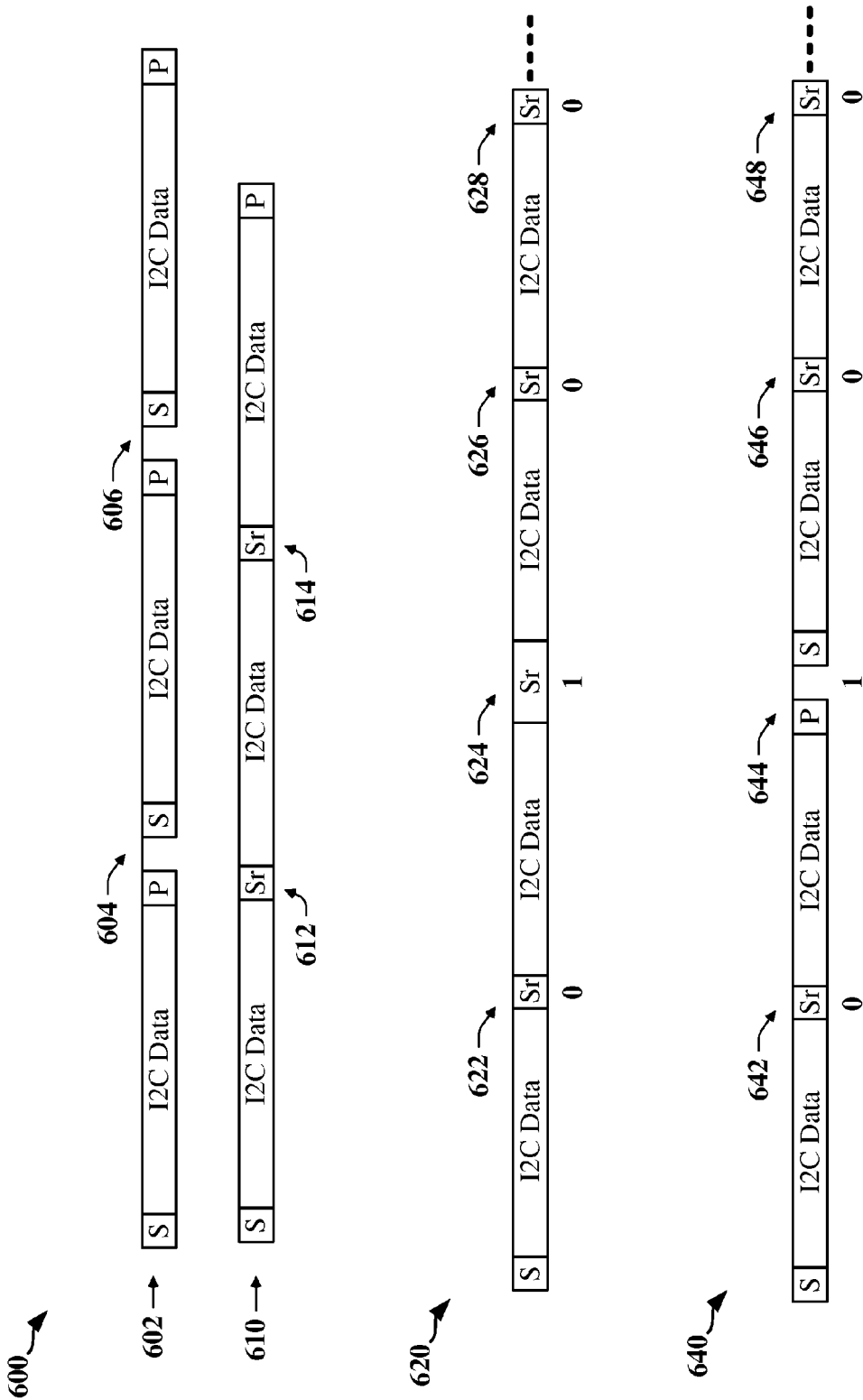
FIG. 6 is a timing diagram illustrating transmission of secondary data over an I2C bus by varying an aspect of a terminating condition.

With reference now to the timing diagrams 600, 620 and 640 of FIG. 6 and the timing illustrated in FIG. 5, additional in-band data may be transmitted in the combination of start conditions 526, 528 and/or the duration of the start conditions 526 and/or 528 used in connection with the transmission of a sequence of bytes. For reference, FIG. 6 includes a first timing diagram 600 showing one conventional transmission of a data stream 602 with combinations of start and stop conditions 604, 606 separating consecutive I2C frames, and another conventional transmission of a data stream 610 with repeated start conditions 612, 614 separating consecutive I2C frames.

According to one aspect, and as shown in the second timing diagram 620 of FIG. 6, an I2C bus master may be adapted to provide a secondary channel over an I2C bus by encoding data in the duration of repeated start conditions 622, 624, 626 and 628. In the example depicted, binary "1" is transmitted as a longer repeated start condition 624, while binary "0" is transmitted as a shorter repeated start condition 622, 626, 628. The duration of the repeated start conditions 622, 624, 626, 628 may be modulated by controlling the period of the hold time ($t_{HD,STA}$) 426 between a falling edge of the SDA signal wire 402 and the falling edge of the SCL signal wire 404 in a start condition 422 (see FIG. 4). Data to be encoded may be used to select the duration of the hold time 426 used on each occasion 622, 624, 626 and 628 selected from two or more durations that exceed the minimum hold time 426 defined in the I2C Specifications. The I2C Specifications define minimum hold times of 4 µs for standard-mode operation, 0.6 µs for fast-mode operation, and 0.26 µs for fast-mode plus operation. A receiver in an I2C slave device may be configured or adapted to detect variations in the period of the hold time ($t_{HD,STA}$) 426 of terminating conditions and, in at least some instances, differences in the magnitude of such variations. The hold time 426 may be varied for start conditions 510 or 526 occurring after an idle period 514 or 530 or in a repeated start condition 528 (see FIG. 5).

According to one aspect, and as shown in the third timing diagram 640 of FIG. 6, an I2C bus master may be adapted to provide a secondary channel on an I2C bus by encoding data in the type of terminating condition 642, 644, 646 and 648 transmitted after an I2C frame. In the example depicted, binary "1" is transmitted in a terminating condition 644 that includes a stop condition and a start condition, while binary "0" is transmitted as a repeated start condition 642, 646, 648.

Figure 7:
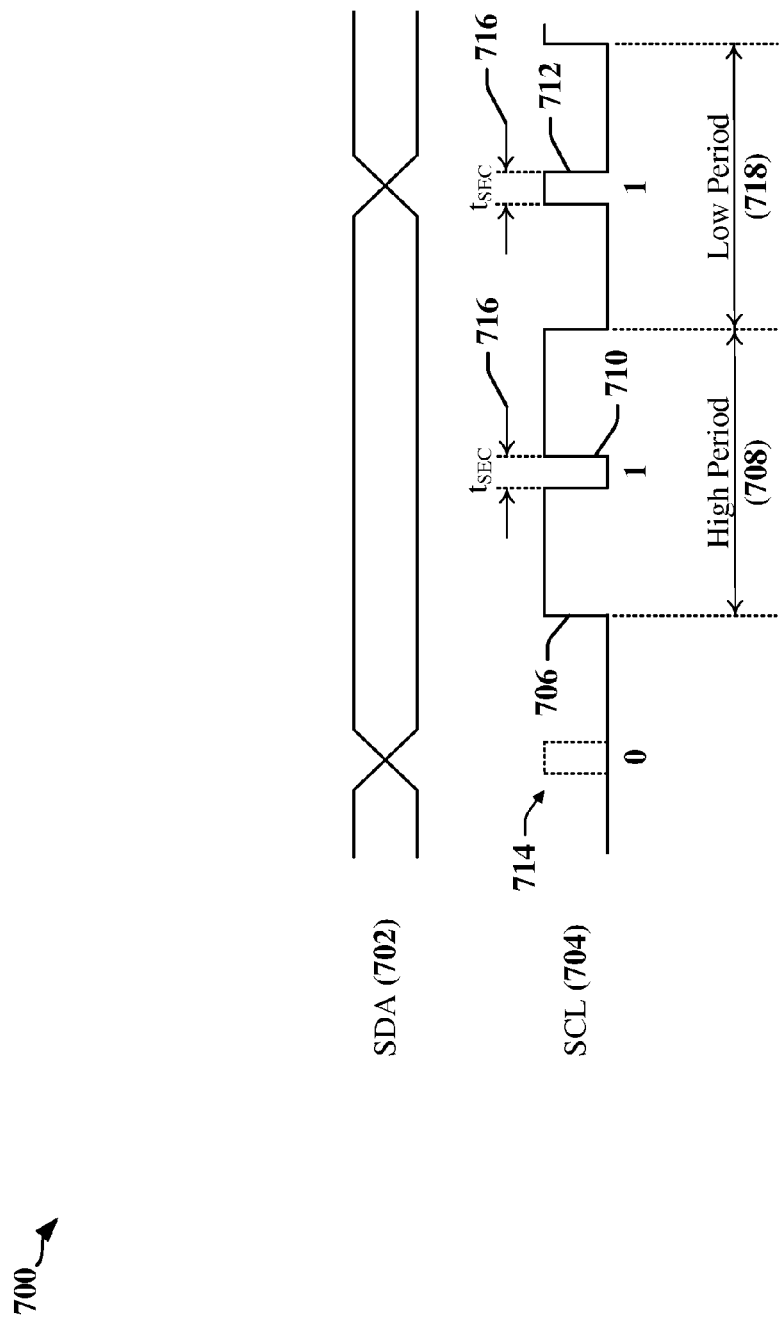
FIG. 7 is a timing diagram illustrating transmission of secondary data over an I2C bus by inserting short pulses on a clock signal.

With reference now to the timing diagram 700 of FIG. 7, additional in-band data may be transmitted in short pulses 710, 712 or in an absence 714 of a short pulse on the SDA signal 702 or the SCL signal 704. The I2C Specifications define a pulse width ($t_{SP}$) of a spike that must be suppressed by an input filter of a conventional I2C receiver in certain modes of operation. In one example, the $t_{SP}$ pulse width may be specified as having a maximum duration of 50 ns. Accordingly, any pulses that are shorter than 50 ns are filtered and ignored by conventional I2C receivers. An I2C transmitter may be adapted or configured to provide a virtual secondary channel over an I2C bus by encoding data in short pulses. In the simple example depicted, two pulses 710 and 712 having a duration ($t_{SEC}$) 716 may represent a binary "1," while a binary "0" may be determined when a pulse is not detected. In this example, two bits may be transmitted on the virtual secondary channel in one bit interval of the I2C protocol. The pulses may be transmitted on SDA signal 702 or SCL signal 704, provided the pulse has a duration $t_{SEC} < t_{SP}$, where $t_{SP}$ is specified for a current mode of operation of the I2C bus.

In one example, additional short pulses 710, 712 may be added in the period of time 708 when the SCL signal 704 is in the High logic state and in the period of time 718 when the SCL signal 704 is in the Low logic state, respectively. In other examples, a short additional pulse 710 or 712 may be added when the SCL signal 704 is in one of the two periods of time 708 or 718. That is, short additional pulses 710 or 712 may be inserted only during the low period 718, with no pulses being inserted during the high period 708, or vice versa. In some examples, more than one additional pulse may be added in one or more of the periods of time 708, 718. Short pulses may be additionally or alternatively be added to the SDA signal 702 in the manner described for short pulses 710, 712 added to the SCL signal 704.

With reference again to FIG. 4, minimum durations 410, 414 for the High and Low logic states of the SDA signal wire 402 and SCL signal wire 404 are defined in the I2C Specifications for certain modes of operation. In the example of Fast-mode operation, the duration ($t_{HIGH}$) 410 of each logic High period must be greater than 0.6 µs, and the duration ($t_{LOW}$) 414 of each logic Low period must be greater than 1.3 µs, with no maximum values specified. Accordingly, I2C devices may be adapted to modulate the width of the logic states 410, 414 of the SCL signal wire 404, provided the minimum specified durations 410, 414 for the High and Low logic states of the SCL signal wire 404 are obeyed.

Figure 8:
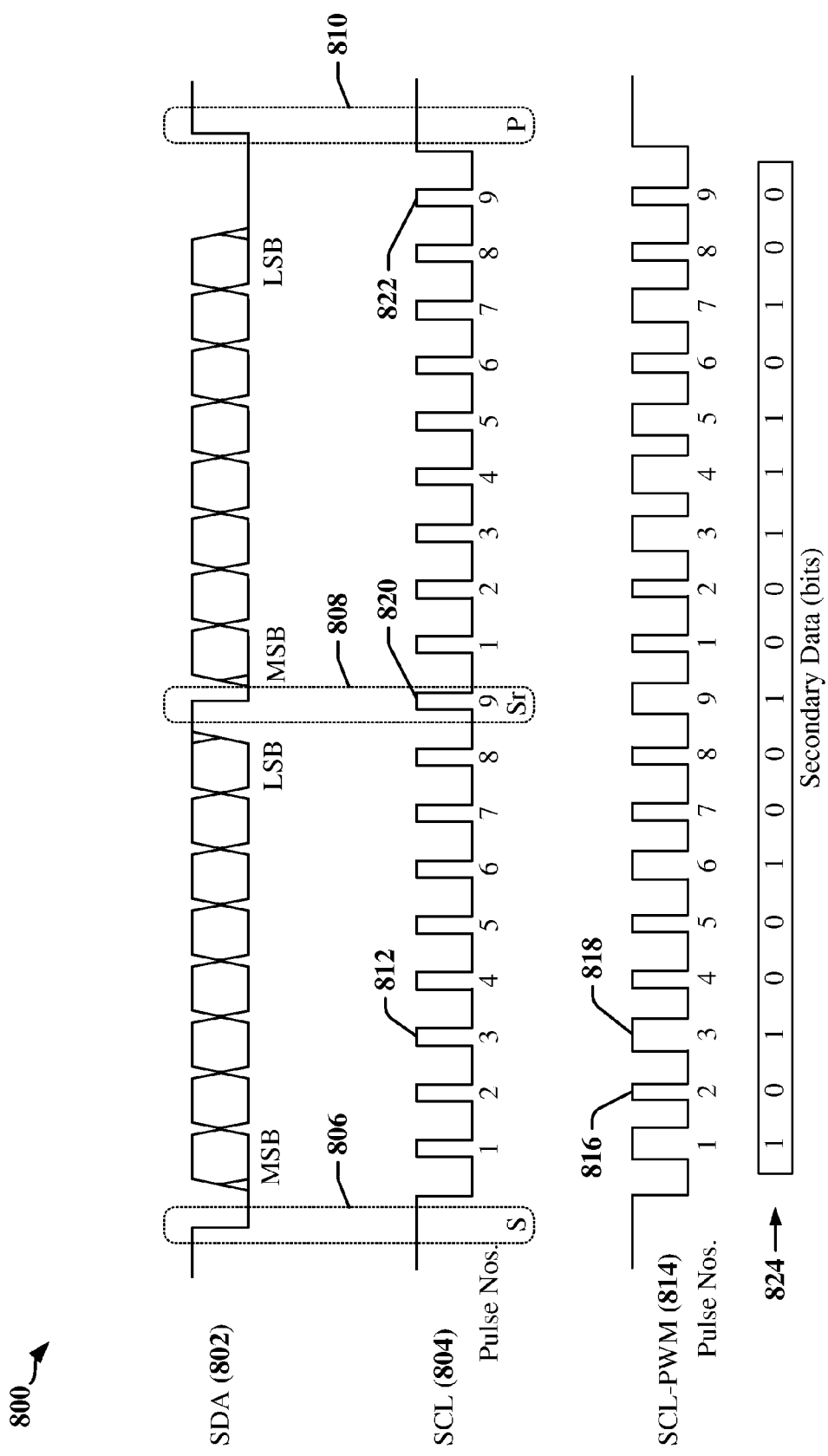
FIG. 8 is a timing diagram illustrating transmission of secondary data over an I2C bus by pulse width modulating a clock signal.

FIG. 8 is a timing diagram 800 illustrating the transmission of additional in-band data by using pulse-width modulation (PWM) to provide a secondary channel on an I2C bus. When PWM is used, the duration of each clock pulse 816, 818 on the SCL signal 804 is determined by the value of at least one bit of secondary data 824 to be encoded in the secondary channel. An I2C bus master device that is adapted to pulse-width modulate the SCL clock signal may encode primary data on an I2C signal transmitted on the SDA signal 802 in accordance with an operating mode defined in the I2C Specifications. The data may be encoded in transmission intervals defined by a conventional SCL clock signal 804. This combination of signaling may provide a primary communication channel on the I2C bus.

The I2C master device may also encode secondary data on the SCL signal 804 using PWM to obtain a modulated SCL signal 814. In the simple example depicted, the I2C master device may use short pulses 816 to encode bits 824 with a value '0' and longer pulses 818 to encode bits 824 with a value '1'. The pulse width of each type of pulse 816 and 818 may be maintained within predefined limits on duration. As can be appreciated, the use of PWM can at least double the bandwidth of the I2C bus between devices that support PWM. Each transmission of a byte transmitted on the SDA signal 802 provides 9 clock pulses that may be encoded using PWM. In one example, one data byte and a control bit may be sent on the PWM encoded SCL signal 814 while one data byte is being transmitted on the SDA signal 802. In some instances, a block of 9 bytes can be transmitted on the PWM encoded SCL signal 814 when a block of 8 bytes is transmitted on the SDA signal 802. Other PWM schemes may be used and more than one bit may be encoded provided receiving I2C devices can be adapted or configured to distinguish differences in timing of the short pulses 816, the longer pulses 818 and even longer pulses.

I2C devices that are adapted to transmit and/or receive a PWM encoded SCL signal 814 are typically configured to recognize and/or distinguish between a start condition 806, a repeated start condition 808 and a stop condition 810 in order to synchronize PWM encoders and decoders. The SCL signal 804, 814 may be in a High logic state for prolonged periods of time preceding a start condition 806 or a stop condition 810. When a repeated start condition 808 is transmitted, the pulse 820 of the repeated start condition 808 may be available for encoding data using PWM when, for example, the pulse 820 of a repeated start condition 808 has the same duration as other pulses 812 in the base SCL signal 804. In some examples, the repeated start condition may use a pulse 820 that has a duration that is different from the other pulses 812 in the base SCL signal 804, including when secondary data is encoded in the duration of modulated $t_{HD;STA}$ timing as discussed in relation to FIG. 6. In these examples, an encoder of an adapted I2C master may refrain from encoding data on the pulse 820 of the repeated start condition 808. In other examples, an encoder of an adapted I2C master may refrain from encoding data on the ninth clock pulse 820, 822 for all transmissions, in order to simplify logic design, provide an additional channel for encoding data in the termination conditions 806, 808, 810, or for other reasons.

Figure 9:
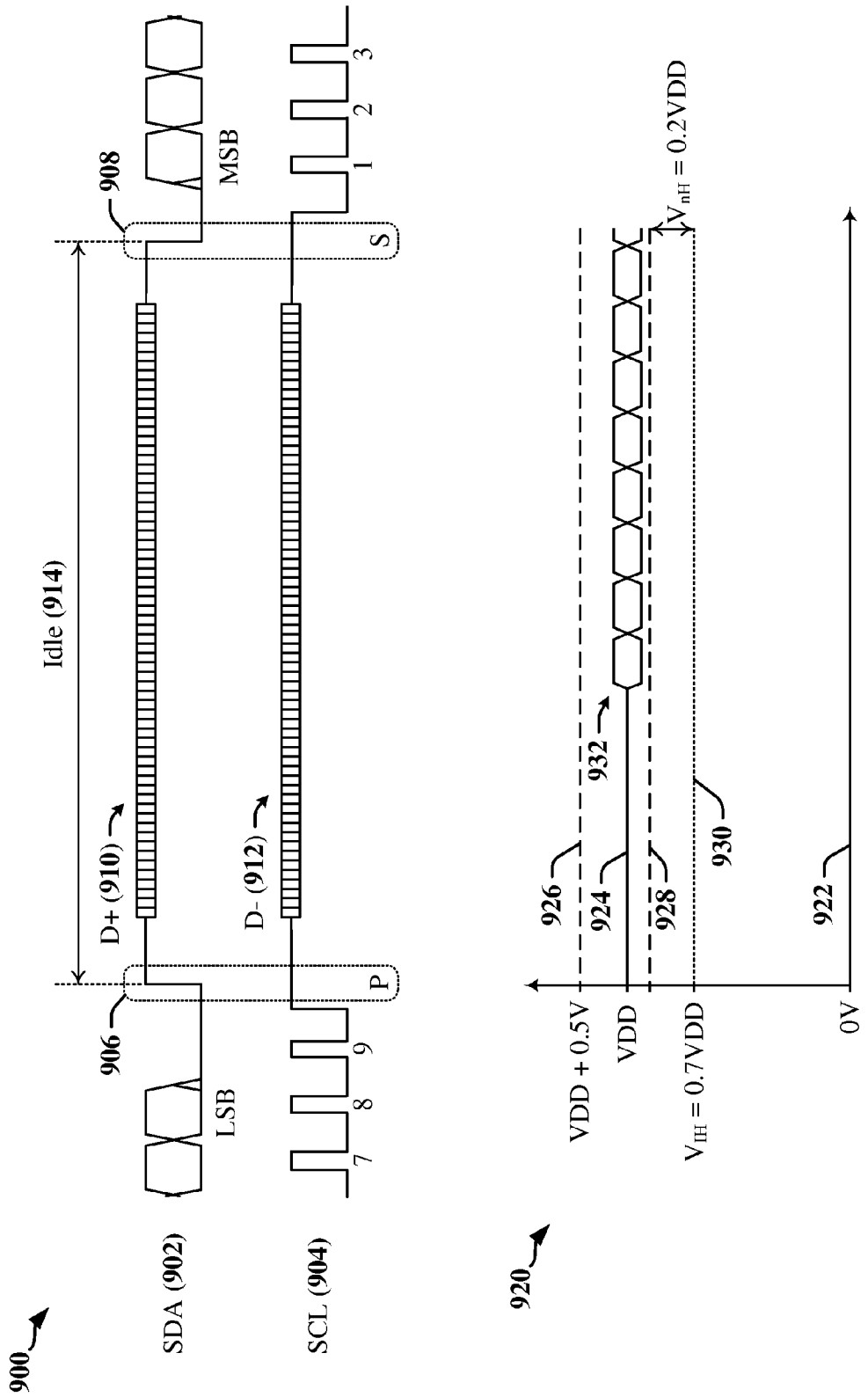
FIG. 9 is a timing diagram illustrating transmission of secondary data over an I2C bus by adding a low-voltage differential signal to the SCL and SDA signals.

FIG. 9 is a timing diagram 900 illustrating the transmission of additional in-band data using differential signaling to provide a secondary channel on the I2C bus. The differential signaling may be accomplished by transmitting a pair of differential signals (D+, D−) 910, 912 by superposition of the complementary signals in the pair of differential signals (D+, D−) 910, 912 on the SDA signal wire 902. In the depicted example, the SDA signal wire 902 carries the D+ signal 910 and the SCL signal wire 904 carries the D− signal 912. The pair of differential signals (D+, D−) 910, 912 is transmitted during at least a portion of the idle time 914 between a stop condition 906 and a start condition 908. The differential signals (D+, D−) 910, 912 are typically low-voltage digital signals that have amplitudes selected to ensure that the high logic state of the SDA and SCL signal wires 902, 904 can be modulated within the tolerances defined in the I2C Specifications for signaling states of the SDA and SCL signal wires 902, 904. In one example, secondary data may be encoded in the differential signals (D+, D−) 910, 912 using non-return-to-zero (NRZ) encoding that can be decoded at the receiver that has a phase-locked-loop (PLL) to synchronize a receive clock to the clock used for encoding the secondary data. In another example, secondary data may be encoded in the differential signals (D+, D−) 910, 912 using PWM. Other encoding schemes may be used as appropriate for the type of secondary data and clock frequency used to encode the secondary data, or for other reasons.

As indicated generally at 920, the I2C Specifications define a nominal high input voltage level ($V_{IH}$) 930 at 70% of a device supply voltage VDD 924, relative to a 0V reference 922. A noise tolerance level ($V_{nH}$) is required for a signal 902, 904 in the High logic state, and the maximum voltage level 926 for an input signal 902, 904 is defined as VDD+0.5V. Consequently, an input signal may range between a minimum voltage level 928 of 0.9×VDD and a maximum level of VDD+0.5V. In the example depicted, input signals 902, 904 may have a high logic state set or configured at VDD 924, with a superimposed differential signal 932 having a peak-to-peak voltage level that is less than 0.2V.

At the receiver, differential receivers may be configured to determine the difference in voltage between the SDA signal wire 902 and the SCL signal wire 904 during the idle period 914. The I2C logic high voltages 924 on both SDA and SCL signal wires 902 and 904 cancel and the differential receivers may provide an output representative of the differential signal 910, 912.

Figure 10:
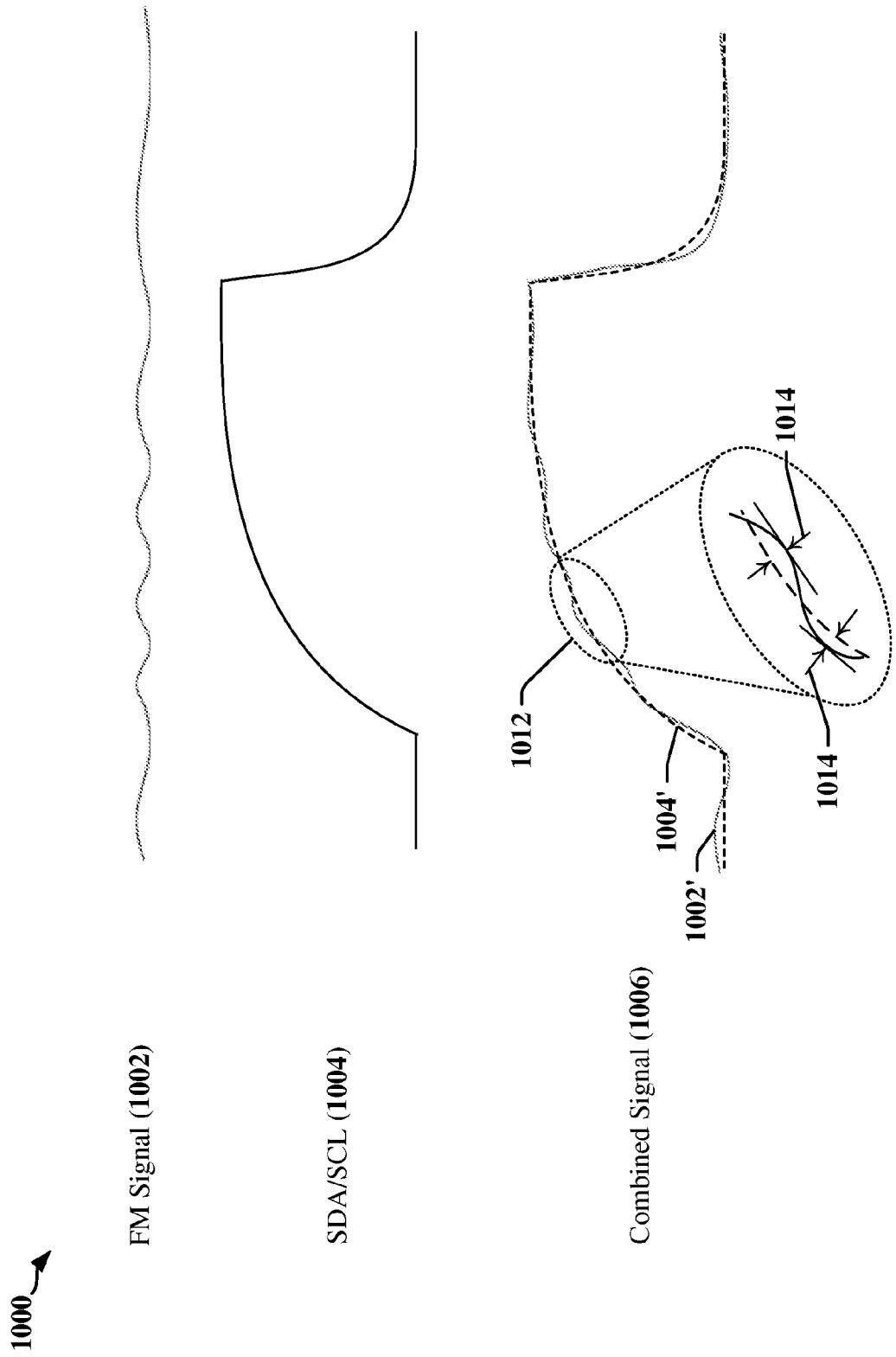
FIG. 10 is a timing diagram illustrating transmission of secondary data over an I2C bus by superimposing an FM signal on the SCL signal or the SDA signal.

FIG. 10 is a diagram 1000 illustrating transmission of additional in-band data using frequency modulation (FM) to provide a secondary channel on the I2C bus. Data may be encoded using FM to vary the instantaneous frequency of a carrier wave and thereby obtain an FM signal 1002 having a substantially consistent peak-to-peak voltage level 1014. The FM signal 1002 may then be overlaid or otherwise superimposed on an I2C signal 1004, which may be the SDA signal and/or the SCL signal. As shown in the detail view 1012, the peak-to-peak voltage 1014 may be selected to be lower than the hysteresis voltage level specified for receivers by the I2C Specifications such that the I2C signaling in the combined signal 1006 can be received and decoded by a conventional I2C slave. The conventional I2C slave may reject, filter or ignore the FM signal 1002 in the combined signal 1006. The FM signal 1002 in the combined signal 1006 may be extracted and demodulated or otherwise decoded by an I2C slave adapted according to certain aspects disclosed herein. The I2C Specifications define a minimum hysteresis voltage level ($V_{hys}$) of 0.05×VDD for Schmitt trigger inputs in the receiver of an I2C device and the peak-to-peak voltage 1014 may be selected to be lower than the specified $V_{hys}$.

The FM signal 1002 may be transmitted on one or both of the SDA and SCL signals. When transmitted on both signal wires of the I2C bus, a timing shift may be provided between versions of the FM signal 1002 transmitted on the two wires to permit easier separation of the FM signal 1002 from the I2C digital signal 1004. Transmission of the FM signal 1002 on both wires of the I2C bus may enable certain noise cancellation techniques to be applied.

Figure 11:
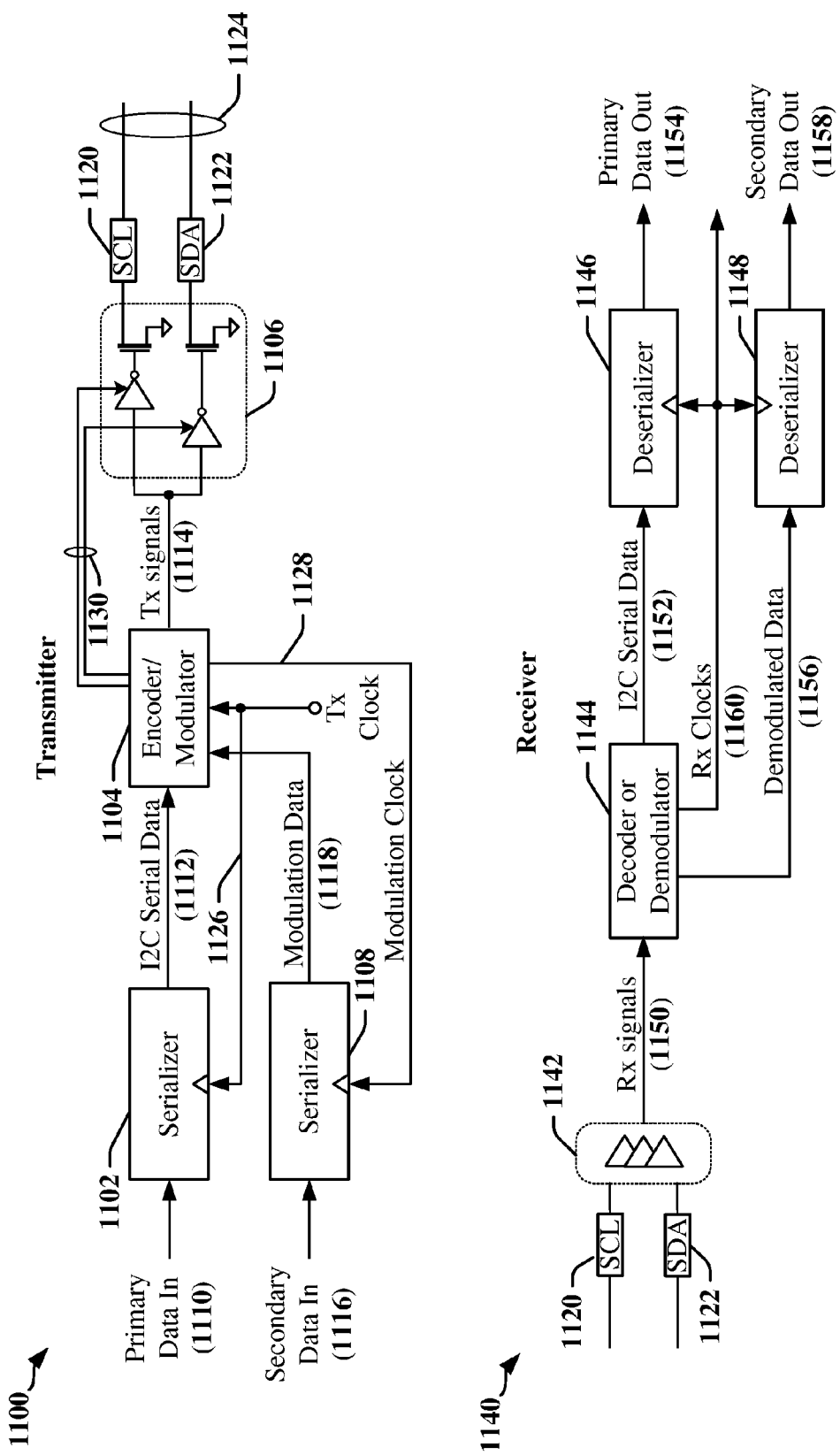
FIG. 11 is a block schematic diagram of an I2C device adapted to send extra in-band information on an I2C bus.

FIG. 11 is a block diagram illustrating an example of a transmitter 1100 and a receiver 1140 coupled to an I2C bus 1124 and configured or adapted according to certain aspects disclosed herein. The transmitter 1100 and/or receiver 1140 may be adapted or configured to enable data 1110 to be transmitted and/or received according to I2C standards-defined. The transmitter 1100 and/or receiver 1140 may be further adapted or configured to enable data 1116 to be transmitted and/or received using secondary channel signaling according to certain aspects disclosed herein. For the purposes of this description, data encoded and transmitted in standards-defined protocols may be referred to as "Primary Data" 1110, and it may be considered that such Primary Data 1110 is transmitted over a primary channel provided by the standards-defined I2C bus 1124. For the purposes of this description, data encoded and transmitted in secondary channel signaling may be referred to as "Secondary Data," 1116 and it may be considered that the Secondary Data 1116 is transmitted over a secondary, or virtual channel on the I2C bus 1124.

For I2C operations, the transmitter 1100 may include a primary channel serializer 1102 that serializes the Primary Data 1110 for transmission on the SDA signal wire 1122 in accordance with the timing of the clock provided on the SCL signal wire 1120. The primary channel serializer 1102 is typically clocked by the transmit clock 1126 to produce I2C serial data 1112 for transmission on the SDA signal wire 1122.

The transmitter 1100 may also be configured or adapted to encode the Secondary Data 1116 in secondary channel signaling transmitted on the I2C bus 1124. In some examples, the Secondary Data 1116 may be serialized by a secondary channel serializer 1108 in order to generate a stream of bits (modulation data) 1118 that can be encoded in the secondary channel signaling. The secondary channel serializer 1108 may be clocked by the transmit clock 1126 and/or by a modulation clock 1128 generated in accordance with a modulation scheme used by the encoder/modulator 1104 to encode Modulation Data 1118 for generating secondary channel signaling. The encoder/modulator 1104 may provide the modulation clock 1128 when secondary channel communications with a slave device has been initiated or negotiated, and the modulation clock 1128 may otherwise be suppressed.

The modulation clock 1128 may be derived or otherwise based on the I2C transmitter clock 1126. For example, the Secondary Data 1116 may be encoded by inserting short pulses 710, 712 into the I2C transmitter clock 1126 (see also FIG. 7) or by pulse width modulating the I2C transmitter clock 1126 (see also FIG. 8), in which case the secondary channel serializer 1108 may receive a phase-shifted, frequency-doubled and/or frequency-divided version of the transmitter clock 1126 to clock a serial stream of bits as modulation data 1118. A modulation clock 1128 may be based on the I2C transmitter clock 1126 in that the modulation clock 1128 may be suppressed when the I2C transmitter clock 1126 is active. For example, the Secondary Data 1116 may be encoded in differential signals 910, 912 transmitted during idle periods 914 during which no clock signal is transmitted on the SCL signal 904 (see FIG. 9), and a modulation clock 1128 is provided only when the differential signals 910, 912 are transmitted.

A modulation clock 1128 may be provided based on I2C frame timing on the I2C bus 1124. For example, the Secondary Data 1116 may be encoded in the configuration and/or selection of start condition 506, a repeated start condition 508 and/or a stop condition 510 (see FIGS. 5 and 6) between bytes transmitted on the SDA signal wire 1122. In the latter example, the modulation clock 1128 may be provided to extract a predefined number of bits based on the occurrence of one or more start or stop conditions 506, 508, 510.

In some instances, the clock rate of the modulation clock 1128 may be independent of the clock rate of the I2C transmitter clock 1126. For example, the data rate of the modulation clock 1128 may be independently determined when FM is used (see FIG. 10, for example) or when digital differential signals 910, 912 are superimposed on the I2C Serial Data signal 1112 and I2C transmitter clock 1126. In some instances, clock information may be encoded in the digital differential signals 910, 912, or the digital differential signals 910, 912 may be transmitted at a predefined clock rate.

The encoder/modulator 1104 may include circuits and modules that can be enabled or disabled based on whether a secondary channel is available over the I2C bus 1124. These circuits may include gates, delays and combinational logic to extend a clock pulse when PWM is used, for example, or when the timing of start conditions 506, repeated start conditions 508 and/or stop conditions 510 is modified to encode Secondary data 1116. The encoder/modulator 1104 may include circuits that adjust the voltage level of one or more logic level to permit modulation by a digital differential signal 910, 912 or by an FM signal 1002.

The encoder/modulator 1104 outputs transmission signals 1114 that are based on the I2C serial data 1112 and the transmitter clock 1126. The transmission signals 1114 may be relayed versions of the I2C serial data 1112 and the transmitter clock 1126 when a secondary channel is not required or desired, or when a receiving device is unable to receive the secondary channel. When a secondary channel is to be provided, one or both of the I2C serial data 1112 and the transmitter clock 1126 may be modulated using one or more modulation techniques. In some instances, modulation circuits of the encoder/modulator 1104 may be configured to control the operation of line driving circuits, such as the open-drain drivers 1106. The line driving circuits may be implemented using push-pull drivers or some other configuration of analog and digital circuits appropriate for the modulation scheme or schemes adopted. In one example, control signals and/or reference voltage levels 1130 may be provided by the encoder/modulator 1104 to control and/or modulate the voltage level of signals transmitted on the SCL and/or SDA signal wires 1120, 1122.

At the receiver 1140, a set of line receivers 1142 may include multiple types of receiving devices. The receiving devices may include differential receivers that can detect voltage modulations of the signals received from the SCL signal wire 1120 and/or the SDA signal wire 1122. In one example, single ended receivers may ignore modulations and respond to signals received from the SCL signal wire and the SDA signal wire 1122 and that are compliant or compatible with the I2C Specifications. At the same time, a differential receiver may compare the voltage levels of the SCL signal wire 1120 and the SDA signal wire 1122 to extract digital differential signals 910, 912 (see FIG. 9). In another example, a differential receiver compares the voltage level of the SCL signal wire 1120 and/or the SDA signal wire 1122 to extract an analog FM encoded signal 1002 (see FIG. 10). Accordingly, the set of line receivers 1142 may provide multiple receive signals 1150 to a decoder/demodulator 1144.

The decoder/demodulator 1144 may be configured to extract I2C serial data 1152 from the SDA signal wire 1122 and to provide an I2C receive clock extracted from the SCL signal wire 1120. The decoder/demodulator 1144 may produce multiple receive clocks 1160, including the I2C receive clock and a demodulation clock that can be used to control descrialization of the data 1156 demodulated or decoded from secondary channel signaling. Deserialization may be performed by a primary channel deserializer 1146 to provide output Primary Data 1154 and a secondary channel deserializer 1148 to provide output Secondary Data 1158.

The decoder/demodulator 1144 may detect the presence of a secondary channel signal that modulates or is superimposed upon the I2C compliant signals transmitted on the SCL signal wire 1120 and/or the SDA signal wire 1122. The receiving circuits 1142 may provide separate I2C compliant signals and modulation signals when the form of modulation used for secondary channel signaling includes some type of modulation of the voltage level of the digital SCL and/or SDA signal wires 1120 and/or 1122. The decoder/demodulator 1144 may include circuits for detecting timing differences in the I2C signals and/or to detect presence or absence of additional short-duration pulses inserted on the I2C signals. Timing differences may be detected using counters, timers, one-shot delays, etc. Detection of timing differences may be determined in every clock cycle and/or between consecutive bytes transmitted on the I2C primary channel.

Figure 12:
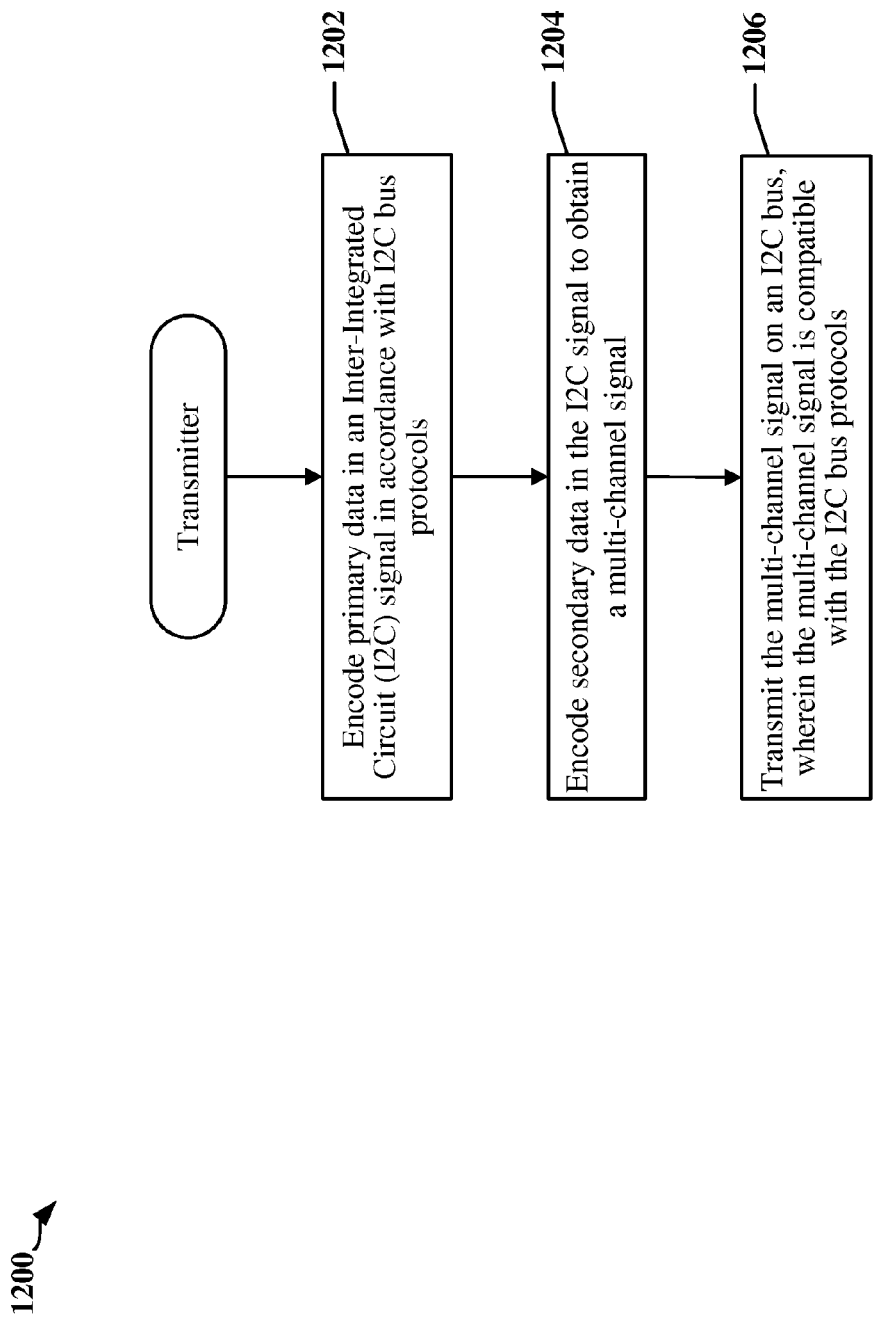
FIG. 12 is a flow chart of a first method for transmitting additional data on an I2C bus according to one or more aspects disclosed herein.

FIG. 12 includes a flowchart 1200 illustrating a method for data communications on an I2C bus. Various steps of the method may be performed by a transmitting device that includes some combination of the I2C slave device 202 illustrated in FIG. 2, the devices 304, 314 or 316 illustrated in FIG. 3, and/or other devices described herein.

At step 1202, the device may encode primary data in an I2C signal in accordance with I2C bus protocols.

At step 1204, the device may encode secondary data in the I2C signal to obtain a multi-channel signal.

At step 1206, the device may transmit the multi-channel signal on an I2C bus. The multi-channel signal may be compatible with the I2C bus protocols.

In one example, the secondary data may be encoded in the I2C signal by encoding the secondary data in a differential signal, where the differential signal includes a pair of complementary signals, and by transmitting the differential signal on the I2C bus by transmitting one of the pair of complementary signals on the SDA of the I2C bus and a different one of the pair of complementary signals on the SCL of the I2C bus. The differential signal may be transmitted on the I2C bus when both the SDA and the SCL are at the high logic level. The SDA and the SCL may have voltage levels that are greater than a minimum voltage specified by the I2C bus protocols for a high logic level and less than a maximum voltage specified by the I2C bus protocols for the high logic level while the differential signal is transmitted over the SDA and the SCL. The differential signal may be transmitted during a period of time when the I2C bus is idle.

In another example, the secondary data may be encoded in the I2C signal by encoding the secondary data in an FM signal, and transmitting the FM signal over one or more of the SDA and the SCL of the I2C bus. The FM signal may have an amplitude that is less than a minimum hysteresis voltage level for Schmitt trigger inputs used by a receiver of an I2C compatible device. The minimum hysteresis voltage level is defined in the I2C bus protocols.

In another example, the secondary data may be encoded in the I2C signal by inserting or refraining from inserting a short pulse into a signal transmitted on the SDA or the SCL of the I2C bus. The short pulse may be inserted when a value of a bit of the secondary data to be transmitted has a first value and no short pulse is inserted when the bit of the secondary data to be transmitted has a second value. For example, encoding the secondary data in the I2C signal may include inserting or refraining from inserting short pulses into a plurality of half cycles of a clock signal transmitted on the SCL. The short pulse may have a duration that is less than a minimum duration specified by the I2C bus protocols for a pulse of the clock signal. The short pulse may have a duration that is less than a maximum duration specified by the I2C bus protocols for a spike that is to be ignored by an I2C receiver.

In another example, the secondary data may be encoded in the I2C signal by pulse-width modulating a clock signal transmitted on the SCL of the I2C bus. Each high period of the resultant pulse-width modulated clock signal has a duration that exceeds a minimum high period for an SCL clock specified by the I2C bus protocols and each low period of the pulse-width modulated clock signal has a duration that exceeds a minimum low period for an SCL clock specified by the I2C bus protocols.

In another example, the secondary data may be encoded in the I2C signal by transmitting a stop condition followed by a start condition between a pair of consecutive frames that encode primary data, when a bit of the secondary data to be transmitted has a first value, and transmitting a repeated start condition between the pair of consecutive frames when the bit of the secondary data to be transmitted has a second value.

In another example, the secondary data may be encoded in the I2C signal by transmitting a repeated start condition between a pair of consecutive frames, where the repeated start condition has a first of two predefined durations when a bit of the secondary data to be transmitted has a first value, and transmitting a repeated start condition between the pair of consecutive frames with a second of two predefined durations when the bit of the secondary data to be transmitted has a second value.

Figure 13:
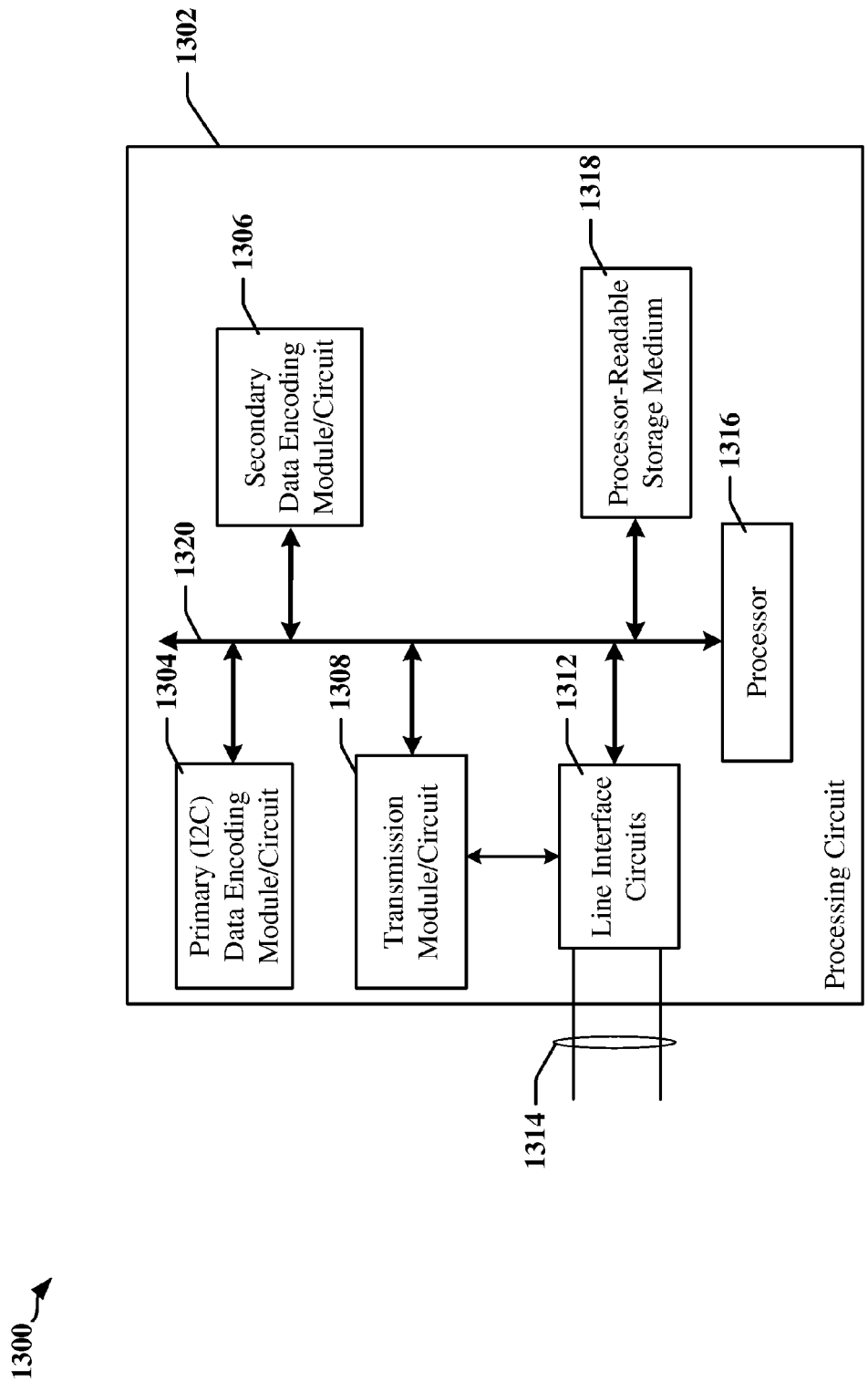
FIG. 13 is a diagram illustrating an example of a hardware implementation for a receiving apparatus that communicates over an I2C bus according to one or more aspects disclosed herein.

FIG. 13 is a diagram illustrating a simplified example of a hardware implementation for an apparatus 1300 employing a processing circuit 1302. The processing circuit typically has a processor 1316 that may include one or more of a microprocessor, microcontroller, digital signal processor, a sequencer and a state machine. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the processor 1316, the modules or circuits 1304, 1306 and 1308, line interface circuits 1312 configurable to communicate over an I2C bus 1314 that includes a plurality of connectors or wires, and the computer-readable storage medium 1318. The bus 1320 may also link various other circuits such as timing sources, peripherals, voltage regulators, and power management circuits, which are well known in the art, and therefore, will not be described any further.

The processor 1316 is responsible for general processing, including the execution of software stored on the computer-readable storage medium 1318. The software, when executed by the processor 1316, causes the processing circuit 1302 to perform the various functions described supra for any particular apparatus. The computer-readable storage medium 1318 may also be used for storing data that is manipulated by the processor 1316 when executing software, including data decoded from symbols transmitted over the I2C bus 1314. The processing circuit 1302 further includes at least one of the modules 1304, 1306 and 1308. The modules 1304, 1306 and 1308 may be software modules running in the processor 1316, resident/stored in the computer-readable storage medium 1318, one or more hardware modules coupled to the processor 1316, or some combination thereof. The modules 1304, 1306 and 1308 may include microcontroller instructions, state machine configuration parameters, or some combination thereof.

In one configuration, the apparatus 1300 for wireless communication includes a module and/or circuit 1304 that is configured to encode primary data in an I2C signal in accordance with I2C bus protocols, a module and/or circuit 1306 that is configured to encode secondary data in the I2C signal to provide a multi-channel signal, and a module and/or circuit 1308 that is configured to transmit the multi-channel signal on an I2C bus 1314 in accordance with the I2C bus protocols.

Figure 14:
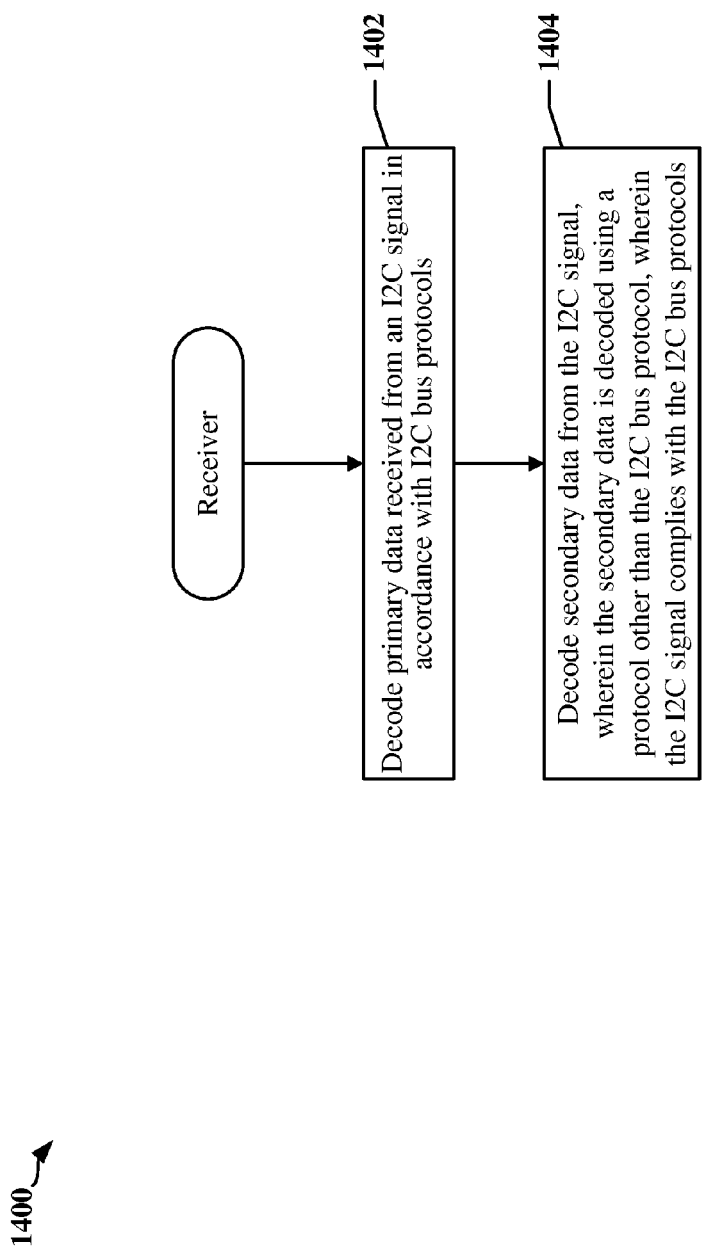
FIG. 14 is a flow chart of a first method for receiving additional data transmitted on an I2C bus according to one or more aspects disclosed herein.

FIG. 14 includes a flowchart 1400 illustrating a method for data communications on an I2C bus. Various steps of the method may be performed by a receiving device that includes some combination of the I2C slave device 202 illustrated in FIG. 2, the devices 304, 314 or 316 illustrated in FIG. 3, and/or other devices described herein. At step 1402, the device may decode primary data received from an I2C signal in accordance with I2C bus protocols.

At step 1404, the device may decode secondary data from the I2C signal. The secondary data may be decoded using a protocol other than the I2C bus protocol. The I2C signal complies with the I2C bus protocols.

In one example, decoding secondary data includes receiving a differential pair of signals from the SDA and the SCL of the I2C bus, where the SDA and the SCL carry different ones of the differential pair of signals, and decoding the secondary data from the differential pair of signals. The differential pair of signals may be received from the I2C bus when both the SDA and the SCL are at the high logic level. The SDA and the SCL may have voltage levels that are greater than a minimum voltage specified by the I2C bus protocols for a high logic level and less than a maximum voltage specified by the I2C bus protocols for the high logic level while the differential pair of signals is received from the I2C bus. The differential pair of signals may be received during a period of time when the I2C bus is idle.

In another example, decoding the secondary data includes receiving an FM signal at least one of the SDA and SCL of the I2C bus, and decoding the secondary data from the FM signal. The FM signal may have an amplitude that is less than a minimum hysteresis voltage level for Schmitt trigger inputs in a receiver of an I2C compatible device as defined in the I2C bus protocols. The voltages of the SDA and the SCL may be greater than a minimum voltage specified by the I2C bus protocols for a high logic level and less than a maximum voltage specified by the I2C bus protocols for the high logic level while the FM signal is being received.

In another example, decoding the secondary data includes determining presence or absence of short pulses in a signal received from SDA and the SCL of the I2C bus, and decoding the secondary data based on the presence or absence of the short pulses. Each of the short pulses may have a duration that is less than a maximum duration specified by the I2C bus protocols for a spike that is to be ignored.

In another example, decoding the secondary data includes determining presence or absence of short pulses in a plurality of half cycles of a clock signal received from the SCL of the I2C bus, and decoding the secondary data based on the presence or absence of the short pulses. Each of the short pulses may have a duration that is less than a maximum duration specified by the I2C bus protocols for a spike that is to be ignored.

In another example, decoding the secondary data includes decoding secondary data in a pulse-width modulated clock signal received from the SCL of the I2C bus. Each high period of the pulse-width modulated clock signal has a duration that exceeds a minimum high period for an SCL clock specified by the I2C bus protocols and each low period of the pulse-width modulated clock signal has a duration that exceeds a minimum low period for an SCL clock specified by the I2C bus protocols.

In another example, decoding the secondary data includes determining a first value for a bit of secondary data when a stop condition and a start condition is received between consecutive frames carrying the primary data on the SDA of the I2C bus, and determining a second value for the bit of secondary data when a repeated start condition is received between the consecutive frames.

In another example, decoding the secondary data includes determining a first value for a bit of secondary data when a repeated start condition received between consecutive frames carrying the primary data on the SDA of the I2C bus has a first duration, and determining a second value for the bit of secondary data when the repeated start condition has a second duration.

Figure 15:
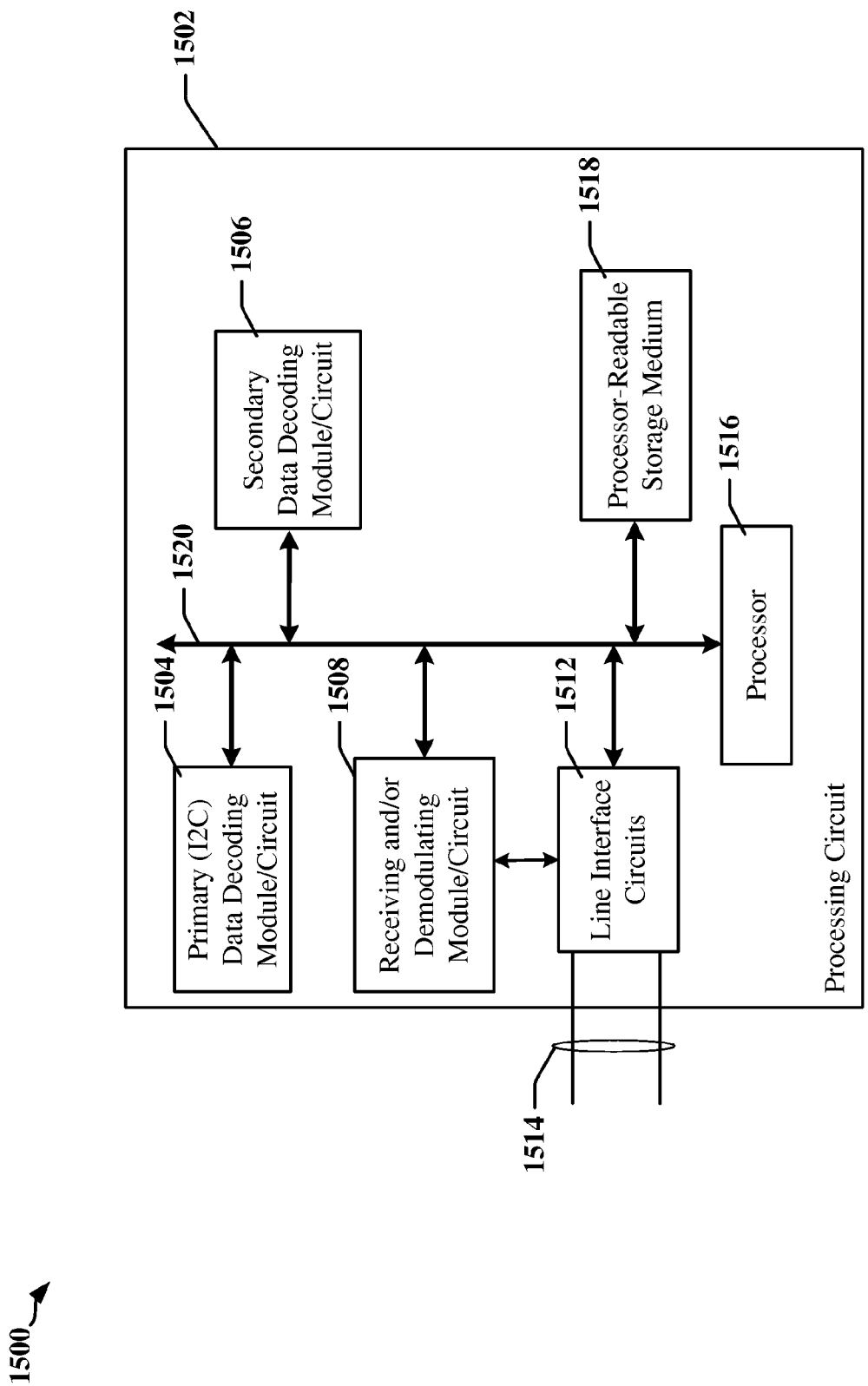
FIG. 15 is a diagram illustrating an example of a hardware implementation for a transmitting apparatus that communicates over an I2C bus according to one or more aspects disclosed herein.

FIG. 15 is a diagram illustrating a simplified example of a hardware implementation for an apparatus 1500 employing a processing circuit 1502. The processing circuit typically has a processor 1516 that may include one or more of a microprocessor, microcontroller, digital signal processor, a sequencer and a state machine. The processing circuit 1502 may be implemented with a bus architecture, represented generally by the bus 1520. The bus 1520 may include any number of interconnecting buses and bridges depending on the specific application of the processing circuit 1502 and the overall design constraints. The bus 1520 links together various circuits including one or more processors and/or hardware modules, represented by the processor 1516, the modules or circuits 1504, 1506 and 1508, line interface circuits 1512 configurable to communicate over an I2C bus 1514 that includes a plurality of connectors or wires, and the computer-readable storage medium 1518. The bus 1520 may also link various other circuits such as timing sources, peripherals, voltage regulators, and power management circuits, which are well known in the art, and therefore, will not be described any further.

The processor 1516 is responsible for general processing, including the execution of software stored on the computer-readable storage medium 1518. The software, when executed by the processor 1516, causes the processing circuit 1502 to perform the various functions described supra for any particular apparatus. The computer-readable storage medium 1518 may also be used for storing data that is manipulated by the processor 1516 when executing software, including data decoded from symbols transmitted over the I2C bus 1514. The processing circuit 1502 further includes at least one of the modules 1504, 1506 and 1508. The modules 1504, 1506 and 1508 may be software modules running in the processor 1516, resident/stored in the computer-readable storage medium 1518, one or more hardware modules coupled to the processor 1516, or some combination thereof. The modules 1504, 1506 and 1508 may include microcontroller instructions, state machine configuration parameters, or some combination thereof.

In one configuration, the apparatus 1500 for wireless communication includes a module and/or circuit 1504 that is configured to decode primary data received from an I2C signal in accordance with I2C bus protocols, a module and/or circuit 1506 that is configured to decode secondary data from the I2C signal, and a module and/or circuit 1508 that is configured to receive the I2C signal from the I2C bus 1514 and to separate and/or demodulate signaling associated with the encoded primary and secondary data I2C signal.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communications on a serial bus, comprising:
   communicating with a first device coupled to the serial bus using first signaling transmitted in accordance with an Inter-Integrated Circuit (I2C) protocol; and
   communicating with a second device coupled to the serial bus using second signaling that is ignored by a receiver of the first device in accordance with the I2C protocol,
   wherein the second signaling includes one or more pulses that have a duration that is less than a maximum duration specified by the I2C protocol for a spike that is to be ignored by the receiver.

2. The method of claim 1, wherein the one or more pulses in the second signaling have a duration that is less than a minimum duration specified by the I2C protocol for a pulse transmitted on an I2C bus.

3. The method of claim 1, wherein the one or more pulses in the second signaling are transmitted on a serial clock line (SCL) of the serial bus.

4. The method of claim 1, wherein the one or more pulses in the second signaling are transmitted on a serial data line (SDA) of the serial bus.

5. The method of claim 1, wherein the maximum duration specified by the I2C protocol for the spike is 50 nanoseconds.

6. The method of claim 1, wherein an input filter of the receiver is configured to suppress pulses that have a duration that is less than 50 nanoseconds.

7. An apparatus coupled to a serial bus, comprising:
   means for communicating with a first device coupled to the serial bus using first signaling transmitted in accordance with an Inter-Integrated Circuit (I2C) protocol; and
   means for communicating with a second device coupled to the serial bus using second signaling that is ignored by a receiver of the first device in accordance with the I2C protocol,
   wherein the second signaling includes one or more pulses that have a duration that is less than a maximum duration specified by the I2C protocol for a spike that is to be ignored by the receiver.

8. The apparatus of claim 7, wherein the one or more pulses in the second signaling have a duration that is less than a minimum duration specified by the I2C protocol for a pulse transmitted on an I2C bus.

9. The apparatus of claim 7, wherein the one or more pulses in the second signaling are transmitted on a serial clock line (SCL) of the serial bus.

10. The apparatus of claim 7, wherein the one or more pulses in the second signaling are transmitted on a serial data line (SDA) of the serial bus.

11. The apparatus of claim 7, wherein the maximum duration specified by the I2C protocol for the spike is 50 nanoseconds.

12. The apparatus of claim 7, wherein an input filter of the receiver is configured to suppress pulses that have a duration that is less than 50 nanoseconds.

13. An apparatus configured to be coupled to a serial bus, comprising:
   an encoder configured to:
      encode first data in first signaling in accordance with Inter-Integrated Circuit (I2C) protocols;
      encode second data in second signaling such that the second signaling is ignored by a receiver operating in accordance with the I2C protocols;
   a transmitter configured to transmit the first signaling and the second signaling on the serial bus; and
   a processing circuit configured to:
      communicate with a first device coupled to the serial bus using the first signaling; and
      communicate with a second device coupled to the serial bus using the second signaling,
   wherein the second signaling includes one or more pulses that have a duration that is less than a maximum duration specified by the I2C protocols for a spike that is to be ignored by the receiver.

14. The apparatus of claim 13, wherein the one or more pulses in the second signaling have a duration that is less than a minimum duration specified by the I2C protocols for a pulse transmitted on an I2C bus.

15. The apparatus of claim 13, wherein the one or more pulses in the second signaling are transmitted on a serial clock line (SCL) of the serial bus.

16. The apparatus of claim 13, wherein the one or more pulses in the second signaling are transmitted on a serial data line (SDA) of the serial bus.

17. The apparatus of claim 13, wherein the maximum duration specified by the I2C protocols for the spike is 50 nanoseconds.

18. The apparatus of claim 13, wherein an input filter of the receiver is configured to suppress pulses that have a duration that is less than 50 nanoseconds.

19. A processor readable non-transitory storage medium comprising code for:
   communicating with a first device coupled to a serial bus using first signaling transmitted in accordance with an Inter-Integrated Circuit (I2C) protocol; and
   communicating with a second device coupled to the serial bus using second signaling that is ignored by a receiver of the first device in accordance with the I2C protocol,
   wherein the second signaling includes one or more pulses that have a duration that is less than a maximum duration specified by the I2C protocol for a spike that is to be ignored by the receiver.

20. The storage medium of claim 19, wherein the one or more pulses in the second signaling have a duration that is less than a minimum duration specified by the I2C protocol for a pulse transmitted on an I2C bus.

21. The storage medium of claim 19, wherein the one or more pulses in the second signaling are transmitted on a serial clock line (SCL) of the serial bus.

22. The storage medium of claim 19, wherein the one or more pulses in the second signaling are transmitted on a serial data line (SDA) of the serial bus.

23. The storage medium of claim 19, wherein the maximum duration specified by the I2C protocol for the spike is 50 nanoseconds.

24. The storage medium of claim 19, wherein an input filter of the receiver is configured to suppress pulses that have a duration that is less than 50 nanoseconds.

* * * * *